United States Patent
Fahey

(10) Patent No.: US 9,639,987 B2
(45) Date of Patent: May 2, 2017

(54) DEVICES, SYSTEMS, AND METHODS FOR GENERATING PROXY MODELS FOR AN ENHANCED SCENE

(71) Applicants: Canon Information and Imaging Solutions, Inc., Melville, NY (US); Canon U.S.A., Inc., Melville, NY (US)

(72) Inventor: Colin Fahey, Irvine, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 202 days.

(21) Appl. No.: 14/317,646

(22) Filed: Jun. 27, 2014

(65) Prior Publication Data

US 2015/0077592 A1    Mar. 19, 2015

Related U.S. Application Data

(60) Provisional application No. 61/840,382, filed on Jun. 27, 2013.

(51) Int. Cl.
*H04N 5/262* (2006.01)
*G06T 19/00* (2011.01)
*H04N 5/222* (2006.01)

(52) U.S. Cl.
CPC ......... *G06T 19/006* (2013.01); *H04N 5/2224* (2013.01)

(58) Field of Classification Search
CPC ..... H04N 5/265; H04N 5/2224; G06T 19/006

USPC .......................................................... 348/239
See application file for complete search history.

(56) References Cited

U.S. PATENT DOCUMENTS

| | | | |
|---|---|---|---|
| 8,040,361 B2 | 10/2011 | Bachelder | |
| 8,280,115 B2 | 10/2012 | Matsumura | |
| 8,477,149 B2 | 7/2013 | Beato | |
| 2006/0023090 A1* | 2/2006 | Takata | H04N 5/2624 348/239 |
| 2009/0244309 A1 | 10/2009 | Maison | |
| 2013/0182225 A1 | 7/2013 | Stout | |

OTHER PUBLICATIONS

Ronald T. Azuma, A Survey of Augmented Reality, In Presence: Teleoperators and Virtual Environments 6, 4 (Aug. 1997), pp. 355-385.

F. Cosco et al., Visuo-Haptic Mixed Reality with Unobstructed Tool-Hand Integration, IEEE Transactions on Visualization and Computer Graphics, Jan. 2013, (vol. 19, No. 1).

At2, Expo Software, downloaded from http://www.at2-software.com/en/expo, Jan. 2013.

DT Ling, Fore-Screen Display and Manipulation for Virtual World Interaction, IBM Technical Disclosure Bulletin, Mar. 1, 1993.

\* cited by examiner

*Primary Examiner* — Usman Khan
(74) *Attorney, Agent, or Firm* — Canon U.S.A., Inc. IP Division

(57) ABSTRACT

Systems, devices, and methods for generating proxy models obtain an image of a scene, generate a proxy model at an initial position and orientation in a world-coordinate system, and repositioning the proxy model to a second position or orientation in the world-coordinate system according to commands received from a controller.

20 Claims, 14 Drawing Sheets

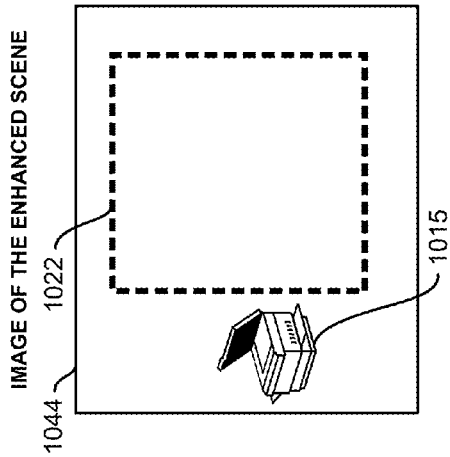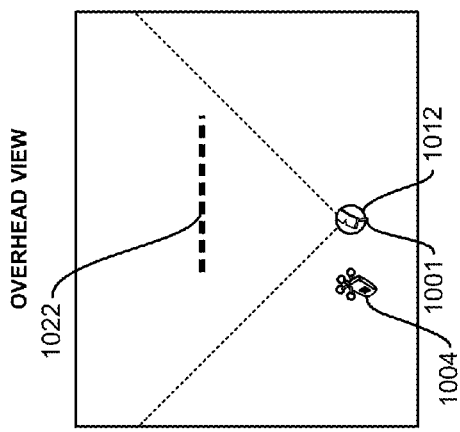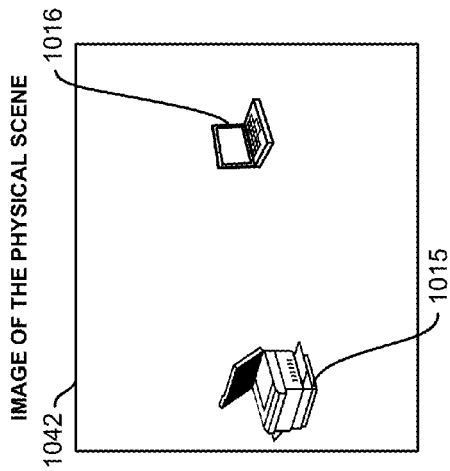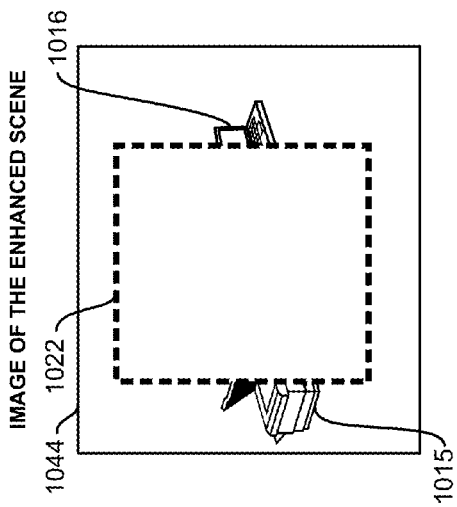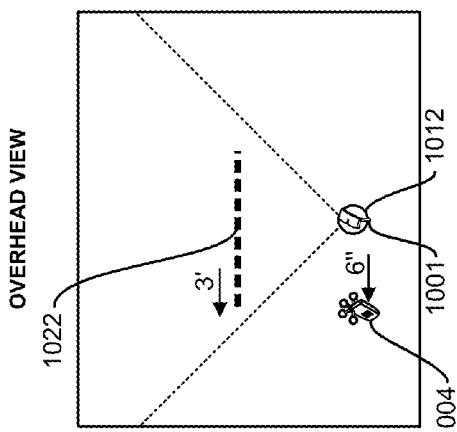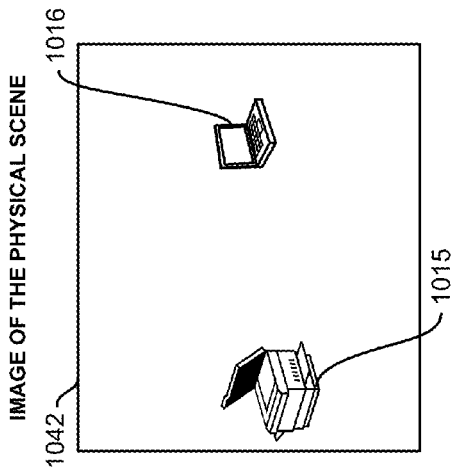

DEVICES, SYSTEMS, AND METHODS FOR GENERATING PROXY MODELS FOR AN ENHANCED SCENE

CROSS-REFERENCE TO RELATED APPLICATIONS

This application claims priority to U.S. Provisional Application No. 61/840,382, which was filed on Jun. 27, 2013.

BACKGROUND

Technical Field

This description generally relates to mixed-reality environments.

Background

In film and video productions, visual effects sometimes make an actor or object in a physical scene appear to be in a different scene. This allows video-production personnel to make scenes without being limited to the immediate physical environment where they are shooting the scene.

SUMMARY

In one embodiment, a method comprises obtaining an image of a scene, generating a proxy model at an initial position and orientation in a world-coordinate system, and repositioning the proxy model to a second position or orientation in the world-coordinate system according to commands received from a controller.

In one embodiment, a system for generating an enhanced image comprises one or more computer-readable media, and one or more processors that are coupled to the one or more computer-readable media and that are configured to cause the system to obtain an image of a physical scene from a physical camera, calculate a position and orientation of the physical camera in a world-coordinate system, generate a proxy model at an initial position and orientation in the world-coordinate system, generate a proxy-model image from the perspective of a virtual camera at the position and orientation of the physical camera based on the proxy model, and reposition the proxy model to a second position or orientation in the world-coordinate system according to commands received from a controller.

In one embodiment, one or more computer-readable media store instructions that, when executed by one or more computing devices, cause the computing devices to perform operations comprising obtaining an image of a physical scene from a physical camera, calculating a position and orientation of the physical camera in a world-coordinate system, generating a proxy model at an initial position and orientation in the world-coordinate system, generating a proxy-model image from the perspective of a virtual camera at the position and orientation of the physical camera based on the proxy model, and repositioning the proxy model to a second position or orientation in the world-coordinate system according to commands received from a controller.

BRIEF DESCRIPTION OF THE DRAWINGS

FIG. 10A illustrates example embodiments of an image of a physical scene, an overhead view of physical space that is associated with a world-coordinate system, and an image of an enhanced scene.

FIG. 10B illustrates example embodiments of an image of a physical scene, an overhead view of a physical space that is associated with a world-coordinate system, and an image of an enhanced scene.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1A:
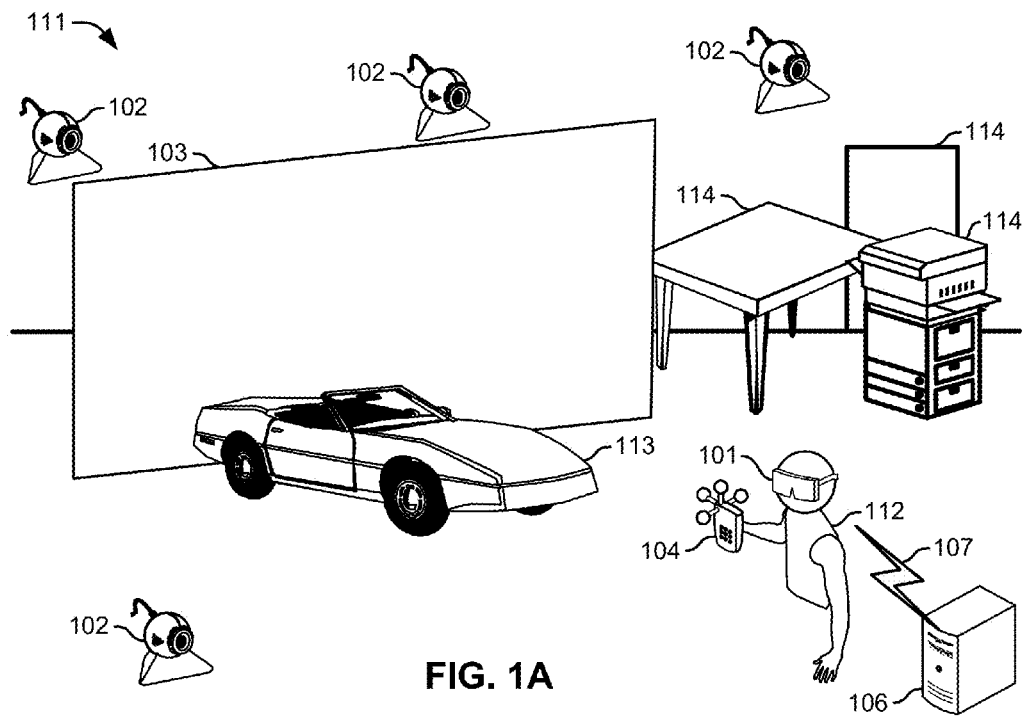
FIG. 1A and FIG. 1B illustrate example embodiments of a physical scene, an enhanced scene, and a system for generating an enhanced scene.
Figure 1B:
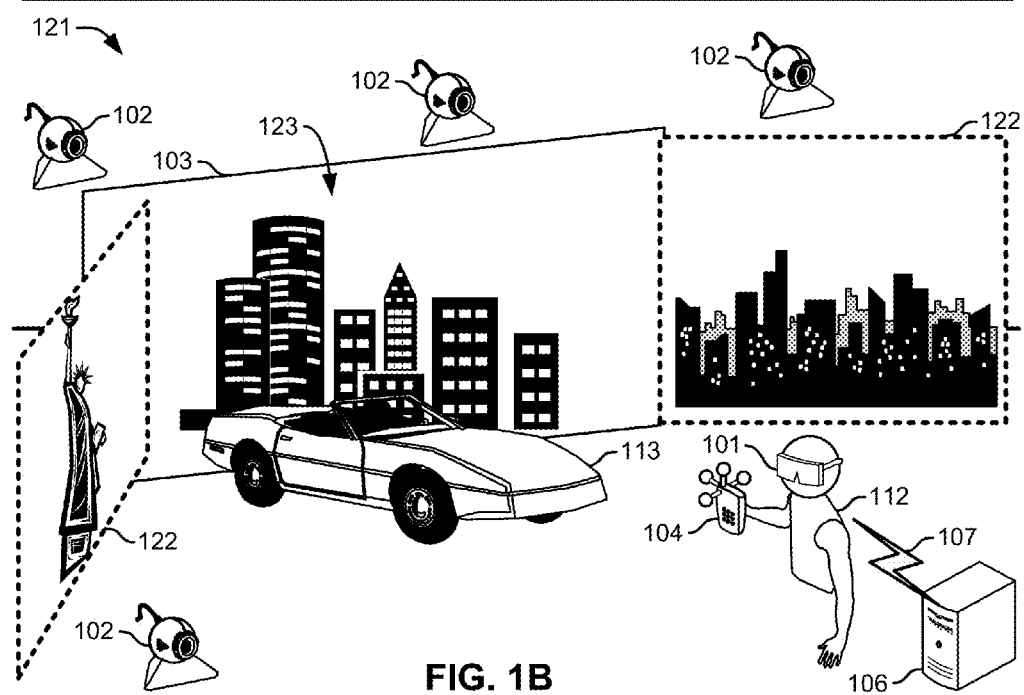

FIG. 1A and FIG. 1B illustrate example embodiments of a physical scene, an enhanced scene, and a system for generating an enhanced scene. The system captures images of the physical scene 111, adds proxy models 122 to the captured images, adds images of a virtual scene to the proxy models 122 (e.g., to visually enhance the images), and generates images of the enhanced scene 121, which include the visual enhancements. Thus, the system can, for example, generate mixed-reality and augmented-reality images of the physical scene 111.

The system includes a model-interface device 101 (e.g., a wearable model-interface device), one or more tracking cameras 102, a screen 103, a controller 104, and one or more image-enhancing devices 106. In this embodiment, the model-interface device 101 includes a camera and a display device. Furthermore, in some embodiments, the model-interface device 101 includes visual markers, which the system can use to determine (e.g., visually determine) the position and orientation of the model-interface device 101.

An image-enhancing device 106 includes one or more computing devices (e.g., desktops, servers, laptops, smart phones) and communicates with the controller 104, the cameras 102, and the model-interface device 101 by means of wireless communication links 107. In some embodiments, the image-enhancing device 106 uses one or more wired communication links in addition to or in alternative to the wireless communication links 107.

The physical scene 111 (which may be in a studio, on a stage, etc.) in FIG. 1A includes the chroma-key screen 103, an observer 112, a foreground object 113, and background objects 114. In FIG. 1A, the physical scene 111 includes an object 113 that is positioned in front of the screen 103 from the perspective of the observer 112 and the model-interface device 101. To the right side of the screen 103, some other objects 114 are visible. Also, tracking cameras 102 around the physical scene 111 capture images of one or more of the following: the observer 112, the controller 104, and the model-interface device 101. In this embodiment, the system uses the images from the tracking cameras 102 to detect at least some of the following: the position of the controller 104, the movements of the controller 104, the position of the model-interface device 101, the movements of the model-interface device 101, the position of the observer 112, and the movements of the observer 112.

Also, the camera of the model-interface device 101 (which is also referred to herein as the "physical camera") captures images (e.g., still photos, videos) of the physical scene 111. For example, the images may be visible-light images of the physical scene 111, which show the physical scene 111 from the perspective of the physical camera. Also, the images may be depth images of the physical scene 111 (physical-scene depth images). Each pixel in a physical-scene depth image has a value that indicates the distance from the physical camera to the nearest point of a physical object that, from the perspective of the physical camera, projects to a point that is within the area of the pixel.

Additionally, the system may map the position and orientation of the physical camera to a world-coordinate system. The positions and orientations of physical objects in the physical scene 111, the positions and orientations of virtual objects (e.g., regular visible models of virtual objects, proxy models) in a virtual scene (e.g., computer-generated scenery), and the positions and orientations of physical objects and the positions and orientations of virtual objects in an enhanced scene 121 can be expressed by coordinates in the world-coordinate system. Thus, the world-coordinate system may define a common coordinate system for a physical scene 111, a virtual scene, and an enhanced scene 121.

The enhanced scene 121 in FIG. 1B, which is presented to the observer 112 by the display device of the model-interface device 101, adds two proxy models 122 (e.g., virtual walls) and a visual effect 123 (e.g., images of a virtual scene), which is applied to the screen 103, to the images of the physical scene 111. The enhanced scene 121 may be presented from the same position and orientation as the physical camera and may add visual effects to the physical scene 121. Thus the enhanced scene 121 may appear to the observer 112 to be the perspective of the physical scene 111, but have additional visual effects (e.g., images of a virtual scene).

Accordingly, the system can arbitrarily mask areas, including isolated areas, in images of a physical scene 111 when generating an image of an enhanced scene 121. The system has a user interface that is analogous to moving and placing real-world chroma-key walls. Furthermore, the system does not require the placement of real-world markers (e.g., to specify the borders of masking regions). Thus, the system can extend visual effects (e.g., a virtual scene that is used as background imagery) beyond the borders of a physical chroma-key screen in chroma-key video-compositing applications by means of proxy models 122, which can be positioned like a physical chroma-key screen in a world-coordinate system that is coincident with real-world space.

Therefore, the system allows areas of images of the physical scene 111 to be overwritten with images of a virtual scene even when using chroma-key color to overwrite the areas of the images of the physical scene 111 is not convenient or practical. For example, it may be impractical to cover the ceiling of a studio with chroma-key material. In such cases, this may mean that the appearance of the physical scene 111 in those areas could not be easily altered in an enhanced scene 121 by means of the chroma-key method.

A proxy model 122 includes one or more polygons, has a position that is defined in the world-coordinate system, has an orientation that is defined in the world-coordinate system, and may be associated with a category (e.g., virtual, real, background, chroma-key proxy). A proxy model 122 designates a region of space relative to the world-coordinate system where particular compositing rules are applied. Accordingly, a proxy model 122 can be used to designate where, for example, images of a virtual scene should be visible, and this designation can override whatever compositing effect would otherwise be in effect (e.g., plain live-video, combined live video and chroma-key effects).

This embodiment of the system generates images of proxy models 122 from the perspective of a virtual camera that has the same position and orientation as the physical camera (of the model-interface device 101) in the world-coordinate system. Also, this embodiment generates the proxy models 122 in the world-coordinate system such that a proxy model 122 can be positioned relative to a physical area or a physical object, for example an area that should be regarded as background, when producing the image of the enhanced scene 121. The current position and orientation of the physical camera (the camera in the model-interface device 101) that acquires the images of the physical scene 111 are used to compute the areas of the image of the enhanced scene 121 that are covered by the proxy models 122 (e.g., from the perspective of the model-interface device 101). Thus, the proxy models 122 are similar to physical screens (e.g., the screen 103), both in how they occupy space and how imagery will appear on them. In some embodiments, a physical foreground object cannot appear "in front of" a proxy model 122, whereas it will appear in front of a chroma-key-based effect 123 on the screen 103.

Furthermore, the proxy models 122 in FIG. 1B include additional visual effects (e.g., images of a virtual scene). Therefore, when the enhanced scene 121 is viewed through the model-interface device 101, the observer 112 also sees the additional visual effects that are added to the two proxy models 122.

Depending on the embodiment, when a user views an image of an enhanced scene 121 using the system, a proxy model 122 can be manifested in at least one of the following modes: (i) no visual manifestation (e.g., no images of a virtual scene and no highlighting; a wireframe outline is used to indicate the proxy model's position and orientation); (ii) the proxy model 122 shows an area of an image of a virtual scene, such as computer-generated scenery that extends beyond a chroma-key-screen area (but otherwise no highlighting and no wireframe outline that explicitly indicate the proxy model's position and orientation); and (iii) the proxy model 122 shows the area of the image of the virtual scene, and the system highlights or outlines (e.g., by means of a wireframe outline) the proxy model 122 to explicitly indicate the proxy model's position and orientation.

In FIG. 1B, the areas of the image of the virtual scene that are added to the proxy models 122, as presented, obstruct the other objects 114. However, the proxy models 122 may be presented in different ways. For example, the proxy models 122 may be filled with a certain color, or the proxy models 122 may be transparent or partially transparent. In some embodiments, the observer 112 can press buttons (or operate other controls) on the controller 104 to choose how a proxy model 122 is presented. For example, a single button might be used to toggle between modes (ii) and (iii) upon each press of the button. By choosing mode (iii), the observer 112 can see the positions and orientations of the proxy models 122, which could be helpful when selecting a proxy model 122 (e.g., by using a virtual laser pointer to aim at a proxy model) to change its position and orientation. Furthermore, the observer 112 may select whether the proxy model 122 shows a virtual-scene image or does not show a virtual-scene image other than an outline or a fill color.

Figure 2:
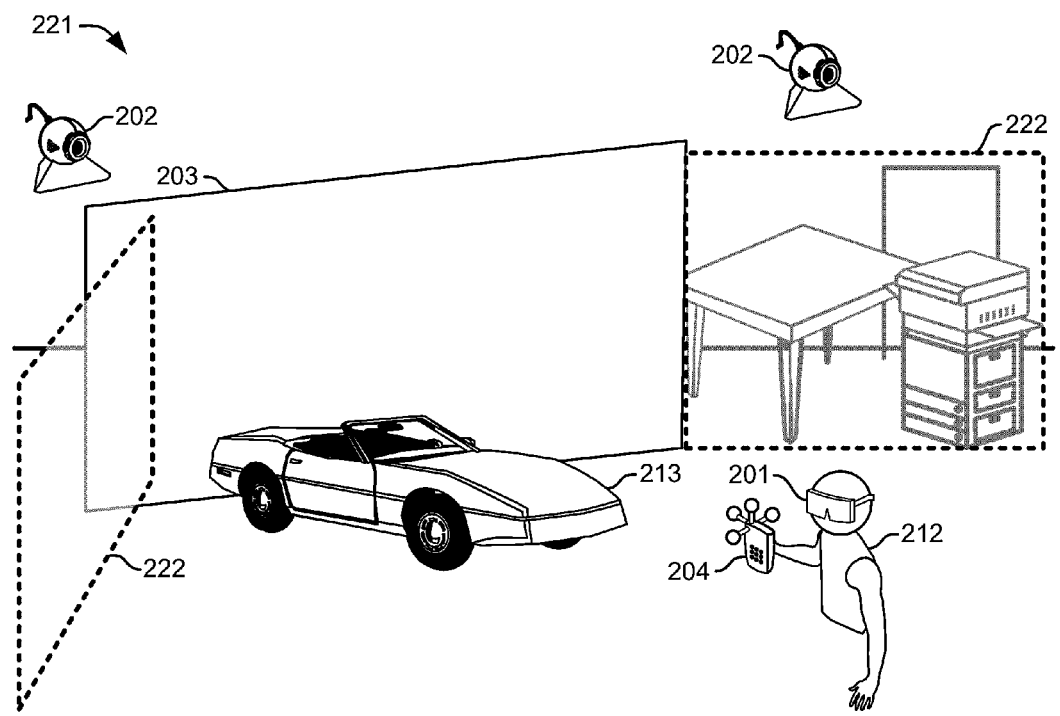
FIG. 2 illustrates an example embodiment of an enhanced scene.

In FIG. 2, which illustrates an example embodiment of an enhanced scene 221, the proxy models 222 are partially transparent, which permits an observer 212 to see the objects that are "behind" the proxy models 222. Furthermore, a proximity distance can be specified for proxy models 222, such that all visual manifestations of a proxy model 222 can be eliminated when the observer 212, the model-interface device 201, or the controller 204 is closer to the proxy model 222 than the specified proximity distance. This can be used to selectively eliminate the visual manifestation of proxy models 222 in the enhanced scene 221 and expose corresponding previously obscured areas of the physical scene, for example when there is risk of the observer 212 walking into a physical obstacle or other hazard. Meanwhile, if the observer 212, the model-interface device 201, or the controller 204 is far enough away from the proxy model 222, the proxy model 222 can manifest its normal visual effect.

Some embodiments gradually decrease the opacity of the visual manifestation of a proxy model 222 in the image of the enhanced scene 221 as the observer 212 or the physical camera gets closer to it. Thus, the visual manifestation gradually fades out, instead of suddenly disappearing, as the observer 212 or the physical camera gets closer to the proxy model 222. Also, as the physical camera (of the model-interface device 201) or the observer 212 moves in the physical scene, the system may let the image of the enhanced scene appear to pass "through" the proxy model 222, which may allow the observer 212 see if the physical camera or the observer 212 has left a particular volume in the world-coordinate system.

Referring again to FIG. 1B, the observer 112 can use body movements (e.g., hand gestures) or movements of the controller 104 to select and change the position, size, shape, or orientation of a proxy model 122. For example, a proxy model 122 may be rotated on the x-axis, y-axis, or z-axis, moved up or down, moved left or right, expanded, or shrunk according to the movements. In some embodiments, the system directly translates (e.g., imitates or imitates with a scale adjustment, for example 0.5 or 0.1) motions of the controller 104 or a member of the observer 112 (e.g., a hand) to motions of a proxy model 122. Some embodiments use the tracking cameras 102 to detect motion of the observer 112 or another user, and commands are conveyed by certain motions (e.g., push, pull, hand moving up, hand moving down, a grasping motion, a releasing motion). Therefore, to position the proxy models 122, an observer 112 can use physical motions that are similar to or identical to the motions that the observer 112 can use to position the screen 103. Also, the observer 112 can see the changes to the positions of the proxy models 122 in real-time or substantially in real-time. Thus, the observer 112 can use physical motions to construct the enhanced scene 121 in real-time or substantially in real-time.

Figure 3:
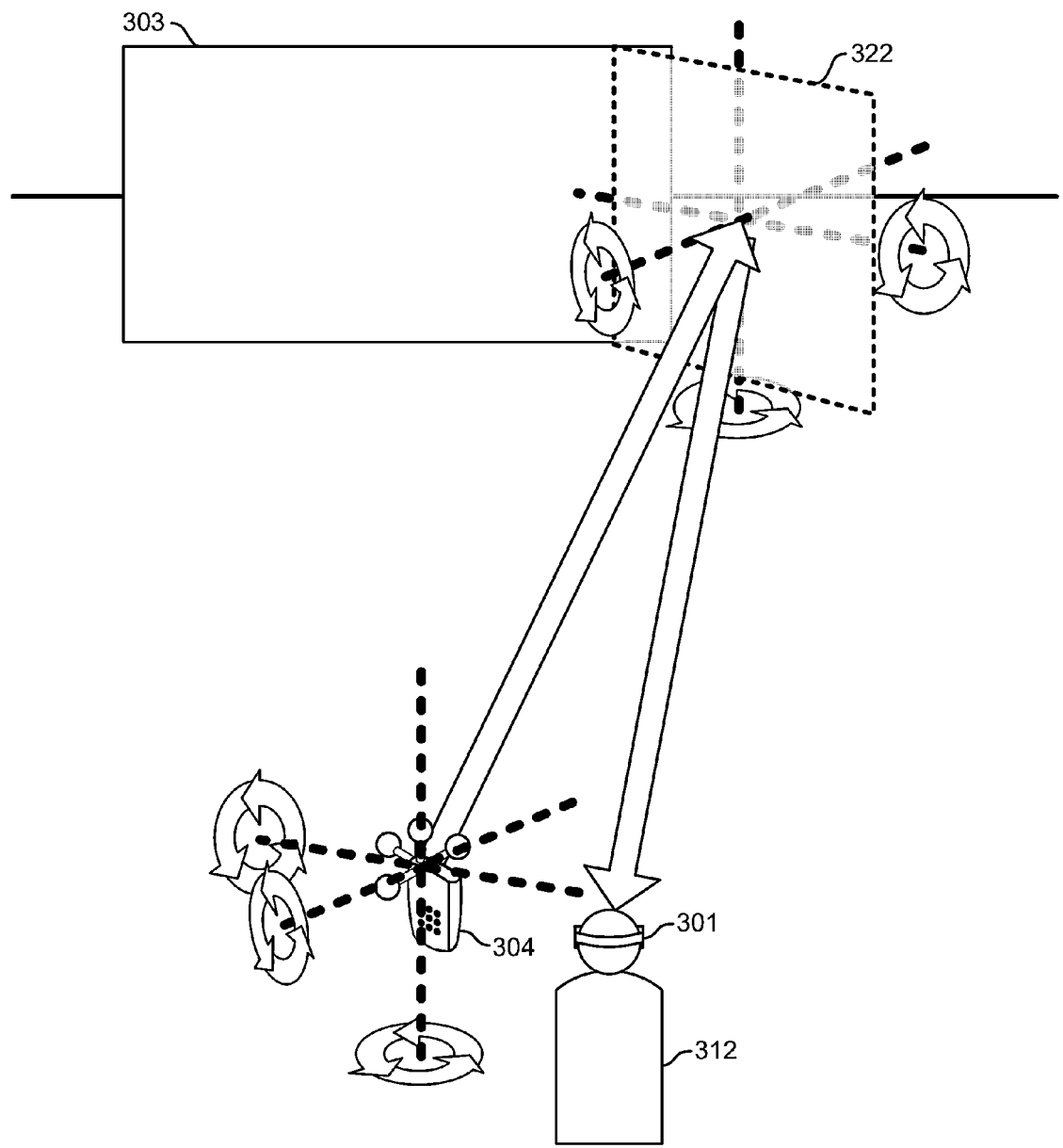
FIG. 3 illustrates an example embodiment of a controller being used to change the orientation of a proxy model.

FIG. 3 illustrates an example embodiment of a controller 304 (a six-degree-of-freedom controller 304) being used to change the orientation of a proxy model 322. The proxy model 322, the observer 312, any chroma-key screens 303, and any other objects in the physical scene are assigned coordinates in a world-coordinate system to track their respective positions. Also, the controller 304 may have a laser-pointer function (e.g., a virtual laser pointer) that can be pointed at a proxy model 322 to indicate a selection of the proxy model 322.

In this embodiment, movements of the controller 304 are translated to movements of the proxy model 322. Thus, if the controller 304 is rotated 50° on the x-axis and 27° on the z-axis, then the system rotates the proxy model 322 by 50° on the x-axis and by 27° on the z-axis, or by some scale adjustment (e.g., ¾) thereof. Also for example, an x cm movement of the controller 304 on the y-axis may be translated into a 2x cm movement of a proxy model 322 on the y-axis in the world-coordinate system. Furthermore, as a proxy model 322 is repositioned, the image of the enhanced scene on the display of the model-interface device 301 may be continuously updated, so that the observer 312 can see the changes to the proxy model 322 as the system makes the changes.

Additionally, the perspective that the observer 312 has of the proxy model 322 is determined based on the position of the observer 312 or of the user-interface device 301, on the position of the proxy model 322, and on the orientation of the proxy model 322. Also, the observer's perception of the proxy model 322 is determined based on the perspective. The perception may be calculated, for example, using a mathematical projection. When the image of the enhanced scene is generated, the observer's perception (which accounts for size, orientation, position) of the proxy model 322 is calculated, and the calculated perception of the proxy model 322 replaces the image of the physical scene in the area that corresponds to the proxy model.

Before or during the movement of a particular proxy model 322, in some embodiments the observer 312 can enable a position and orientation "snapping mode" that affects how a proxy model 322 visually moves in response to the observer's commands (e.g., from the observer's movements of a six-degree-of-freedom controller 304, from computer vision that watches the movements of the observer 312). When such a mode is enabled, an intermediate internal representation of the proxy model's position and orientation is directly controlled by the commands (e.g., movements), but the visual representation of the proxy model 322 shows the proxy model 322 with its position and orientation modified relative to the internal representation such that the wall faces or edges of the proxy model 322 become aligned with the ground plane when the corresponding face or edge of the internal representation is nearly parallel with the ground plane. This snapping behavior may make it easier to precisely position the proxy model's faces parallel to the ground plane (e.g., when making a floor or ceiling virtual wall) or position the proxy model's edges precisely perpendicular to the ground plane (e.g., when making a vertical virtual wall, as if supported by the ground plane).

For example, some embodiments establish a model-coordinate system that has three orthogonal axes and an origin that are fixed in relation to a proxy model 322. And for each axis of the model-coordinate system, if the axis direction is within some specified angle of a particular axis direction of the world-coordinate system, then the orientation of the model-coordinate system is adjusted such that the axis direction of the model-coordinate system becomes exactly aligned with the direction of that particular axis of the world-coordinate system. Also, some embodiments express the orientation of the model-coordinate system in Euler angles, and, for each of the three angles, these embodiments round the angle to the nearest angle of a specified set of discrete angles (e.g., multiples of 15 degrees), thereby adjusting the orientation of the proxy model accordingly. Furthermore, some embodiments round each coordinate value of the origin of the model-coordinate system to the nearest multiple of a specified distance (e.g., 5 cm, 50 cm, 100 cm), and adjust the position of the proxy model 322 accordingly.

Additionally, when a proxy model 322 is selected for adjustment, a control (e.g., a wheel) on the controller, or a motion of the controller 304, could be used to "reel in" or "push out" the proxy model 322 relative to the controller's location, somewhat like using the spool of fishing line on a fishing rod, or using a spool of string to control the distance of a kite in the air. Also, a user motion (e.g., reeling, pulling, pushing) could be used to "reel in" or "push out" the proxy model 322.

Thus, an observer 312 who is viewing the enhanced scene can create and reposition the proxy models 322 in real-time or substantially in real-time. By using the controller 304, which responds to user motions, or by using user motions without a controller in some embodiments, the observer 312 can build and position the proxy models 322 using motions of the observer's body.

The observer 312 can also move within the virtual space while the proxy models 322 are being built and arranged, and the observer 312 can see the changes to the enhanced scene as the changes are made. Moreover, when multiple observers 312 are viewing the same physical scene, but from different perspectives (e.g., using head-mounted model-interface devices 301), each observer 312 can independently control his own viewing mode for the proxy models 322. Thus, an actor in a scene can see the normal effects of proxy models 322, while the director or camera operator can choose to see the positions and orientations of the proxy models 322 for possible adjustment. Also, the perspectives of each observer 312 can be independently determined by the system, so that each of the views may show a unique perspective.

Referring again to FIG. 1B, to implement the virtual effect 123 on the screen 103 (e.g., a chroma-key effect), some embodiments perform chroma-key compositing, in which the embodiments acquire video images of the physical scene 111 that include actors or objects in front of a surface (e.g., the chroma-key screen 103) that has a distinctive color (e.g., a green screen, a blue screen). Then, for each image, these embodiments replace all the areas of the image of the physical scene 111 that have the distinctive color with corresponding areas of an enhanced scene 121. When doing chroma-key compositing, the goal is to replace areas in the image of the physical scene 111 with the visual appearance of the enhanced scene 121, and the areas that are to be replaced are indicated by the presence of colored surfaces (e.g., green screens, blue screens) in the physical scene 111.

To implement the virtual effects on the screen 103, some embodiments perform the following operations: (1) Frame buffer preparation: clear the color buffer, and clear the depth buffer (set the depth of every pixel to the "far" distance value). (2) Background: draw a quad covering the entire viewport (for left eye or right eye, half of the overall application-window area), textured with a video image (from left eye or right eye), with Z-Testing disabled (ensure every pixel will be drawn) and with Z-Writes disabled (when the depth of the quad is irrelevant and is a purely visual manifestation). (3) Images of a virtual scene: draw three-dimensional models in the scene with both Z-Testing and Z-Writing enabled (so that the models affect, and are affected by, the relative overlap of their three-dimensional polygons). (4) Foreground: given an auxiliary texture that represents which pixels in the video match the color-masking color range, draw a quad covering the entire viewport (for left eye or right eye; half of the overall application-window area), textured with the video image (from left eye or right eye), with Z-Testing disabled (so that any pixel in the image may be overwritten, regardless of depth), with Z-Writing disabled (when the depth of this quad is irrelevant to any subsequent drawings), and with Alpha-Testing enabled (where the auxiliary texture is the source of the alpha-pixel values).

Thus, if the alpha value indicates that the pixel color qualifies as the masking color, then do not draw this foreground pixel, which would cover the virtual-scene image layer. The virtual-scene image should appear anywhere that the video is the distinctive color.

Additionally, to draw the proxy models, some embodiments perform the following operations: (1) Clear the color buffer, and clear the depth buffer. (2) Draw the background. (3) Draw the virtual-scene image layer. (4) Clear the depth buffer. (5) Draw mask polygons (e.g., proxy-model polygons) with Depth-testing disabled, with Depth-writes enabled, and with Color-writes disabled. Thus, proxy-model polygons may be unconditionally drawn as depth values, but have no visual manifestation. However, when an observer is placing these polygons in the enhanced scene, color-writing and blending can be optionally enabled, where the polygons are given a semitransparent opacity and a highlight color so that they can be more easily seen by the observer. (6) Draw the foreground: Draw at the far-plane distance (greatest depth), using depth-testing with greater comparison, so that the video (excluding parts with chroma-key color) will appear everywhere the cleared depth buffer was not overwritten by nearer polygons (e.g., the proxy-model polygons).

For plain chroma-key-compositing mode, depth testing may be ignored for the foreground image, and alpha testing alone may be used to determine where to draw. Alpha-testing may be used to implementation chroma-key behavior that determines the visibility of foreground pixels that are not within proxy-model polygons. For example, in the total absence of virtual-wall polygons, the regular chroma-key behavior would be in effect. Thus, the foreground image, which fills the entire viewport, may overwrite all color pixels of the viewport, thus obscuring all images of the virtual scene except in places where a proxy-model polygon exists or in places where the video image has chroma-key-color pixels.

Figure 4:
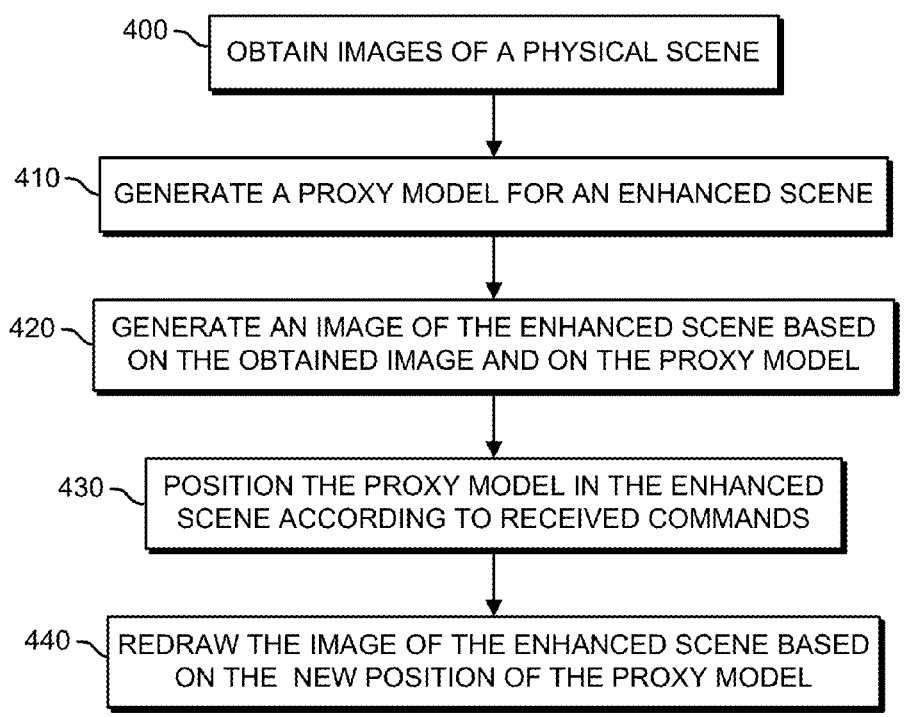
FIG. 4 illustrates an example embodiment of an operational flow for the generation of proxy models in an enhanced scene.

FIG. 4 illustrates an example embodiment of an operational flow for the generation of proxy models in an enhanced scene. The blocks of this operational flow and the other operational flows that are described herein may be performed by one or more computing devices, for example the computing devices described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

The flow starts in block 400, where the system obtains one or more images (e.g., a video) of a physical scene. For example, some embodiments acquire image "I" (W columns, H rows) of a physical scene using a video camera. Next, in block 410, the system generates one or more proxy models for an enhanced scene. The system may define a world-coordinate system for the scene and determine the coordinates of the proxy model within the scene. Also, the system may assign respective coordinates to an object in the physical scene. For example, some embodiments generate an image "M" (W columns, H rows) that shows only the proxy models (e.g., each wall is completely opaque and has a uniform color over its entire surface) against a background color (e.g., black) as the proxy models would be seen from the perspective (position, orientation, field of view) of the camera that acquires the image "I" of the physical scene as if the proxy model existed in the real world.

The flow then proceeds to block 420, where an image of the enhanced scene is generated based on the obtained image and on the position of the proxy model. For example, some embodiments generate a virtual-scene image "CG" (W columns, H rows) of a three-dimensional scene as if seen from the perspective (position, orientation, and field of view) of the camera that acquired the image of the physical scene. And some embodiments generate an image of the enhanced scene "J" (W columns, H rows) by considering the pixels from images "I", "CG", and "M", for example according to the following:

```
for ( y = 0; y < H; y++ )
{
    for ( x = 0; x < W; x++ )
    {
        if
        (
            (IsChromaKeyGreen(I(x,y)) == true) // Chroma-key match...
            || (M(x,y) != black)        // ...or, proxy-model overlap
        )
        {
            // Output pixel from CG
            J(x,y) = CG(x,y);
        }
        else
        {
            // Output pixel from acquired image
            J(x,y) = I(x,y);
        }
    }
}
```

The flow then moves to block 430, where the proxy model is positioned (e.g., rotated, moved) or reshaped (e.g., expanded, shrunk) in the enhanced scene according to received commands (e.g., from a controller, from a user's movements). The positioning or reshaping of the proxy model may include calculating new coordinates of the proxy model based on the received commands. Then in block 440, the image of the enhanced scene is redrawn based on the new position and shape of the proxy model and based on one or more of the following: the current image of the enhanced scene, the image "I", the image "M", the image "CG," and the image "J".

Figure 5:
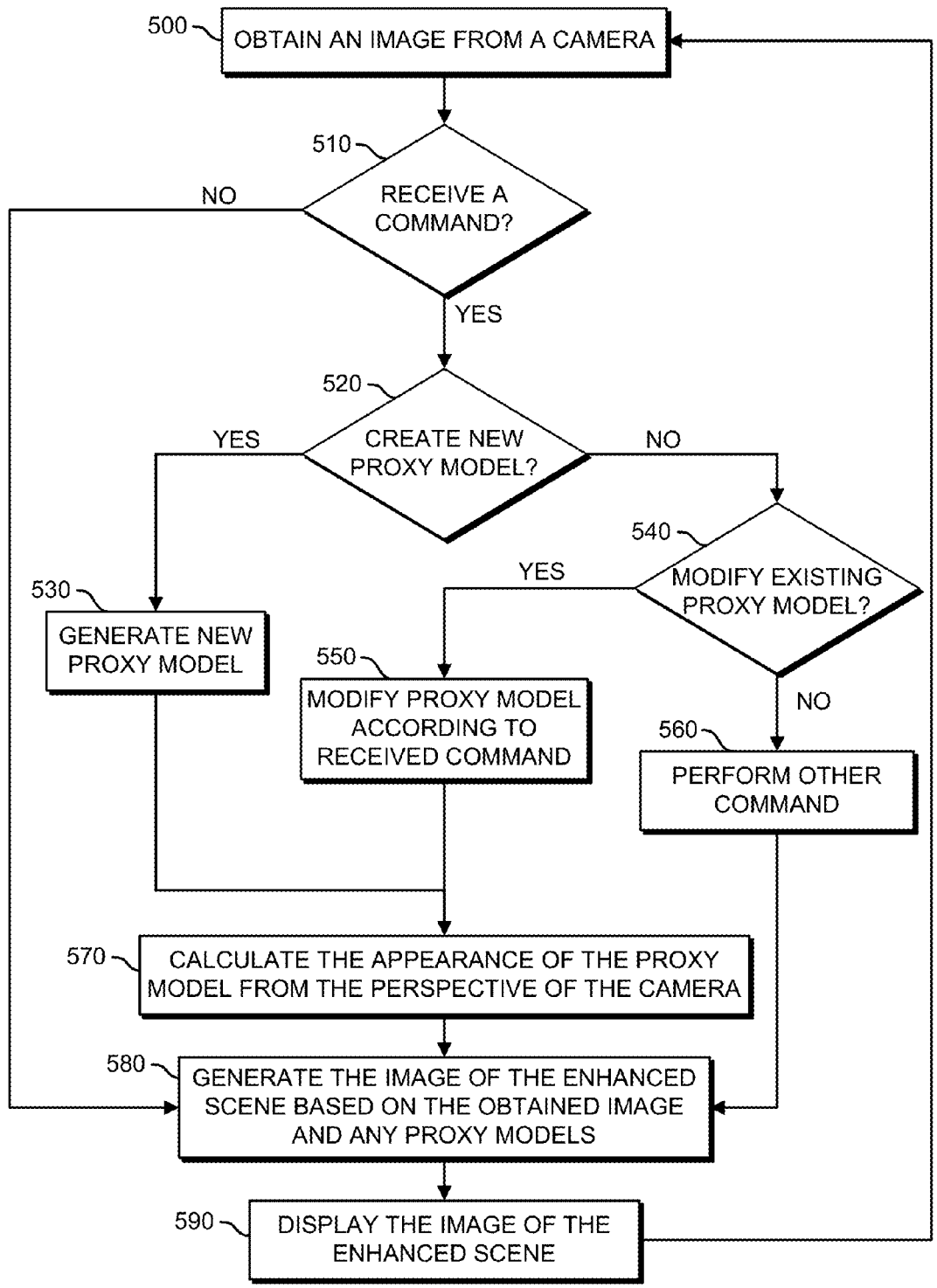
FIG. 5 illustrates an example embodiment of an operational flow for the generation of proxy models in an enhanced scene.

FIG. 5 illustrates an example embodiment of an operational flow for the generation of proxy models in an enhanced scene. The flow starts in block 500, where an image of a physical scene is obtained from a camera. Depending on the embodiment, an image of an enhanced scene may already be presented to an observer. Next, in block 510, it is determined (e.g., by a computing device) if a user command is received (e.g., via a controller, via user movement). If not (block 510=NO), then the flow moves to block 580, where an image of the enhanced scene is generated based on the obtained image and the positions of any proxy models. If yes (block 510=YES), then the flow proceeds to block 520, where it is determined if the command is a command to create a new proxy model.

If it is determined that the received command is a command to create a new proxy model (block 520=YES), then the flow moves to block 530, where the system creates a new proxy model, and then the flow moves to block 570. If in block 520 it is determined that the received command is not a command to create a new proxy model (block 520=NO), then the flow moves to block 540.

In block 540, it is determined if the command is a command to modify an existing proxy model. If yes (block 540=YES), then the flow moves to block 550, where a proxy model is modified according to the received command. The modification of the proxy model may be a change of appearance (e.g., change color, add or remove virtual-scene imagery, add or remove a wireframe, make more transparent, make less transparent), size, position, or orientation. After block 550, the flow moves to block 570. If in block 540 it is determined that the command is not a command to modify an existing proxy model (block 540=NO), then the flow moves to block 560, where the other command is performed, and then the flow proceeds to block 580.

In block 570, the appearance of the new or modified proxy model is calculated from the perspective of the camera. Next, in block 580, the image of the enhanced scene is generated (e.g., redrawn) based on the obtained image and the appearance of any proxy models. The flow then moves to block 590, where the image of the enhanced scene is displayed on a model-interface device, and then the flow returns to block 500.

Figure 6:
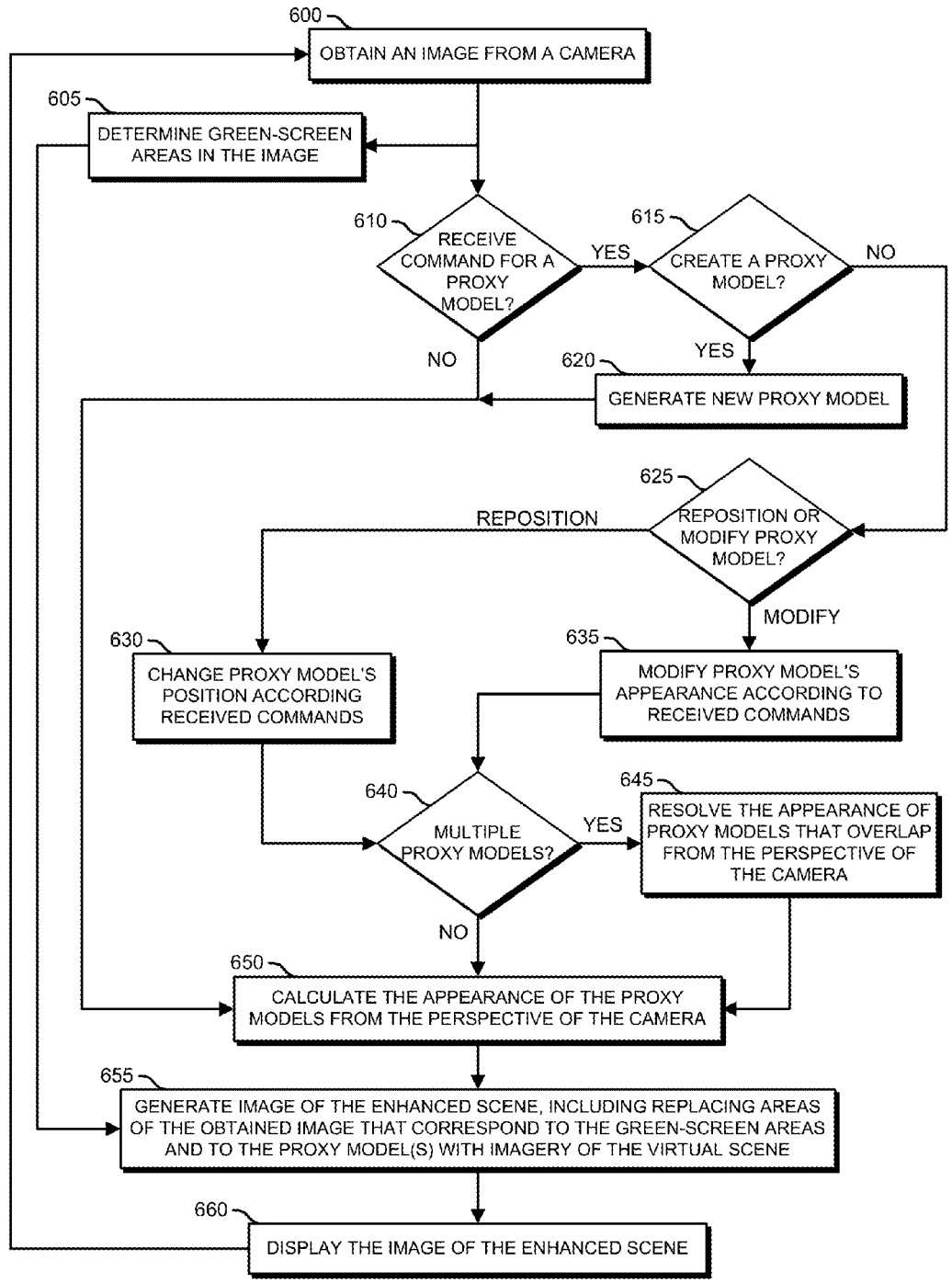
FIG. 6 illustrates an example embodiment of an operational flow for the generation of proxy models in an enhanced scene.

FIG. 6 illustrates an example embodiment of an operational flow for the generation of proxy models in an enhanced scene. The flow starts in block 600, where an image is obtained from a physical camera. The flow then splits into two flows. A first flow proceeds to block 605, where chroma-key areas in the image are determined, and then the first flow moves to block 655.

A second flow proceeds to block 610, where it is determined (e.g., by a computing device) if a command for a proxy model is received. If not (block 610=NO), then the second flow moves to block 650. If yes (block 610=YES), then the second flow moves to block 615.

In block 615, it is determined if the command is a command to create a proxy model. If yes (block 615=YES), then the second flow moves to block 620, where a new proxy model is generated (e.g., at a default position), and then the second flow moves to block 650. If in block 615 it is determined that a proxy model is not to be created (block 615=NO), then the second flow proceeds to block 625.

In block 625, it is determined if a proxy model is to be repositioned or if a proxy model is to be otherwise modified. If a proxy model is to be repositioned (block 625=REPOSITION), then the second flow moves to block 630. In block 630, the proxy model's position is changed according to the received commands, which in some embodiments are indicated by motions of the observer or motions of a controller. After block 630, the second flow moves to block 640.

If a proxy model is to be otherwise modified (block 625=MODIFY), then the second flow moves to block 635. In block 635, the proxy model's appearance (e.g., color, outline, transparency, virtual-scene imagery) is modified according to the received commands, which in some embodiments are indicated by motions of the observer, motions of a controller, or by commands send from an activated control (e.g., button, wheel, slider, control pad, joystick) on a controller. After block 635, the second flow proceeds to block 640.

In block 640, it is determined if the enhanced scene includes multiple proxy models. If not (block 640=NO), then the flow moves to block 650. If yes (block 640=YES), then the flow moves to block 645. In block 645, the appearance of proxy models that overlap from the perspective of the camera is resolved (e.g., using Boolean logic). The second flow then proceeds to block 650.

In block 650, the appearance of the proxy models from the perspective of the camera is determined. Next, in block 655, an image of the enhanced scene is generated. The generating includes replacing areas of the obtained image that correspond to the chroma-key areas and to the proxy models with images of the virtual scene. The second flow then moves to block 660, where the image of the enhanced scene is presented by a model-interface device, and then the second flow returns to block 600.

To perform the operations in block 655, some embodiments perform the following operations. These embodiments operate on or generate the following: (1) Pixel: The color of a pixel can be represented by a combination of color component values such as (r,g,b) or (h,s,v). (2) Image: A grid (e.g., rectangular grid) of pixels having a specific number of columns and a specific number of rows. (3) Image I: An image of an original environment acquired by a camera, where I(x,y) represents the pixel at column x and row y. (4) Image CG: Images of the virtual scene (e.g., computer-generated scenery), where CG(x,y) represents the pixel at column x and row y. (5) Image M: An image that shows only three-dimensional proxy models (each completely opaque, and with the same uniform color over the entire surface area) against a black background color, as those proxy models would be seen from the perspective (position, orientation, and field of view) of the camera that acquired image I of the physical scene and as if those proxy models existed in the physical scene. M(x,y) represents the pixel at column x and row y. (6) Image J: the desired output image, where J(x,y) represents the pixel at column x and row y.

In this description, for images I, CG, M, and J, the images have W columns of pixels and H rows of pixels, column 0 is the left-most column of the image, column (W-1) is the right-most column of the image, row 0 is the top row of the image, and row (H-1) is the bottom row of the image. Also, each pixel has a color that is represented by a combination of color-component values, such as (r,g,b) or (h,s,v).

In block 544, to generate the image of the enhanced scene (image J), some embodiments perform the following operations:

```
for ( y = 0; y < H; y++ )
{
    for ( x = 0; x < W; x++ )
    {
        if (IsChromaKeyGreen(I(x,y)) == true)
        {
            // Chroma-key match
            // Output pixel from CG
            J(x,y) = CG(x,y);
        }
        else
        {
            // Output pixel from acquired image
            J(x,y) = I(x,y);
        }
    }
}
```

The function IsChromaKeyGreen(c) returns "true" when color "c" is an exact match, or is close enough, to a specified chroma-green (i.e., green-screen) color, and otherwise returns "false".

Also, the addition of the proxy-model effect to the regular chroma-key effect increases the ways an acquired-image pixel can qualify to be replaced by a virtual-scene pixel. To generate the image of the enhanced scene (image J), some embodiments perform the following operations to generate a chroma-key effect with an added proxy-model effect:

```
for ( y = 0; y < H; y++ )
{
    for ( x = 0; x < W; x++ )
    {
        if
        (
            (IsChromaKeyGreen(I(x,y)) == true) // Chroma-key match...
            || (M(x,y) != black)        // ...or, proxy-model overlap
        )
        {
            // Output pixel from CG
            J(x,y) = CG(x,y);
        }
        else
        {
            // Output pixel from acquired image
            J(x,y) = I(x,y);
        }
    }
}
```

Some embodiments use another implementation of a chroma-key effect with an added proxy-model effect, where the generated image that represents the areas covered by proxy models (from the perspective of the camera or observer) is represented by a depth image (depth buffer) instead of a color image (color buffer). In the previous example embodiment, image M is formed by drawing the three-dimensional proxy models against a black background, thus enabling the system to use the colors of the pixels in image M to determine which pixels are covered by proxy models. However, image M could be formed by drawing a three-dimensional scene that consists only of three-dimensional meshes that represent proxy models to a cleared color buffer.

Also, instead of using image M, some embodiments form a different kind of image: a depth image D. The depth image D includes the depth values of the polygon areas of three-dimensional proxy models, and sets the depth to zero everywhere else, as those proxy models would be seen from the perspective of the camera that acquired the image I of the physical scene, as if those proxy models existed in the physical scene, where D(x,y) represents the depth value at column x and row y.

In some embodiments, the depth image D is formed by drawing the depth values of a three-dimensional scene that consists of three-dimensional meshes that represent proxy models to a cleared depth buffer. With such a depth image, the embodiments may use a different rule to decide whether each pixel is covered by the area of a proxy model. For example, if (D(x,y)!=0), then the pixel is covered by a proxy model.

Some embodiments generate the image of the enhanced scene (image J) according to the following:

```
for ( y = 0; y < H; y++ )
{
    for ( x = 0; x < W; x++ )
    {
        if
        (
            (IsChromaKeyGreen(I(x,y)) == true)
            || (D(x,y) != 0)
        )
        {
            // Output pixel from CG
            J(x,y) = CG(x,y);
        }
        else
        {
            // Output pixel from acquired image
            J(x,y) = I(x,y);
        }
    }
}
```

The entire output color buffer can initially be filled with a copy of the image of the virtual scene CG as a default hypothesis (i.e., as if the entire field of view of the camera-acquired image I were covered by chroma-key or proxy-model areas). Then the depth-testing mode can be selected to draw pixels that are not covered by proxy models, and, for such drawn pixels, a "fragment shader" (e.g., function evaluated per pixel) can draw the corresponding pixel from the acquired image I with an opacity value which is opaque only when IsChromaKeyGreen(I(x,y)) is false, and otherwise with full transparency. Thus, if a pixel is covered by a proxy model, or if a pixel matches the chroma-key green, then the initial pixel color (copied from the image CG) is not replaced by the pixel color of the acquired image I.

Some embodiments generate the image of the enhanced scene (image J) according to the following:

```
// Fill output image entirely with CG as default hypothesis
for ( y = 0; y < H; y++ )
{
    for ( x = 0; x < W; x++ )
    {
        J(x,y) = CG(x,y);
    }
}
```

These operations draw a quad that is textured with an acquired image I on top of an output image. If this actually succeeds for all pixels, then the output image J would match the acquired image I. But, by selecting an appropriate depth test (using depth buffer contents as input), and an appropriate fragment shader (with the camera-acquired image pixels (in the active texture) as input), the drawing here will selectively fail for some pixels, letting image CG remain for pixels covered by proxy-model areas or where the acquired image I matches the chroma-key color.

Furthermore, some embodiments enable blending mode: EnableBlendingMode( ) II Enable blending mode where dst'=src*alpha+dst*(1-alpha);

```
for ( y = 0; y < H; y++ )
{
    for ( x = 0; x < W; x++ )
    {
        // Per-pixel operations follow:
        // Effect of particular depth-testing mode
        if (D(x,y)==0)
        {
            continue; // Skip drawing this pixel
        }
        // Effect of fragment-shader code
        if (IsChromaKeyGreen(I(x,y)) == false)
        {
            // The following is essentially achieved with blending mode active,
            // and with RGB=I(x,y).RGB and Alpha=Opaque.
            J(x,y) = I(x,y);
        }
        else
        {
            // The following is essentially achieved with blending mode active,
            // and with RGB=I(x,y).RGB and Alpha=Transparent.
            // Leave J(x,y) == CG(x,y); i.e., do not overwrite current color
        }
    }
}
```

These operations assume that the output pixel color is not the same as the acquired-image pixel color, but the inverted logic in the algorithm above may lead to a more direct implementation of the algorithm using standard three-dimensional-graphics API features.

Moreover, some embodiments may perform Boolean operations to resolve overlaps (and other combinations) of proxy models from the perspective of the camera. For example, if a Boolean XOR (exclusive or) is used to define the view when proxy models overlap, then the proxy models will appear when one proxy model is defined for a particular part of the view, but when two proxy models overlap, then the original image I is displayed for that part of the view.

Finally, some embodiment use a depth camera (e.g., stereo camera, time-of-flight camera) to sense the depths of objects in the image of the physical scene and allow the proxy models to be defined at a certain depth from the camera. This allows actual foreground objects to appear in front of the proxy models (e.g., the foreground objects are not replaced by virtual-scene images or the virtual-scene images are replaced by the actual image of the physical scene in the areas of the foreground objects).

Figure 7A:
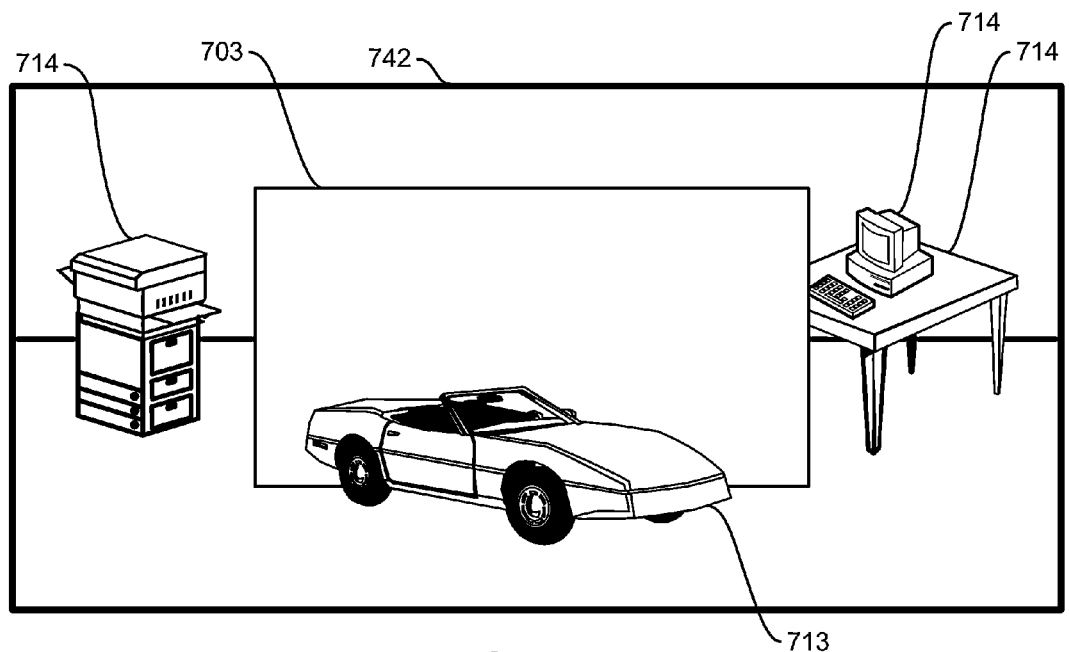
FIG. 7A illustrates an example embodiment of an image of a physical scene.
Figure 7B:
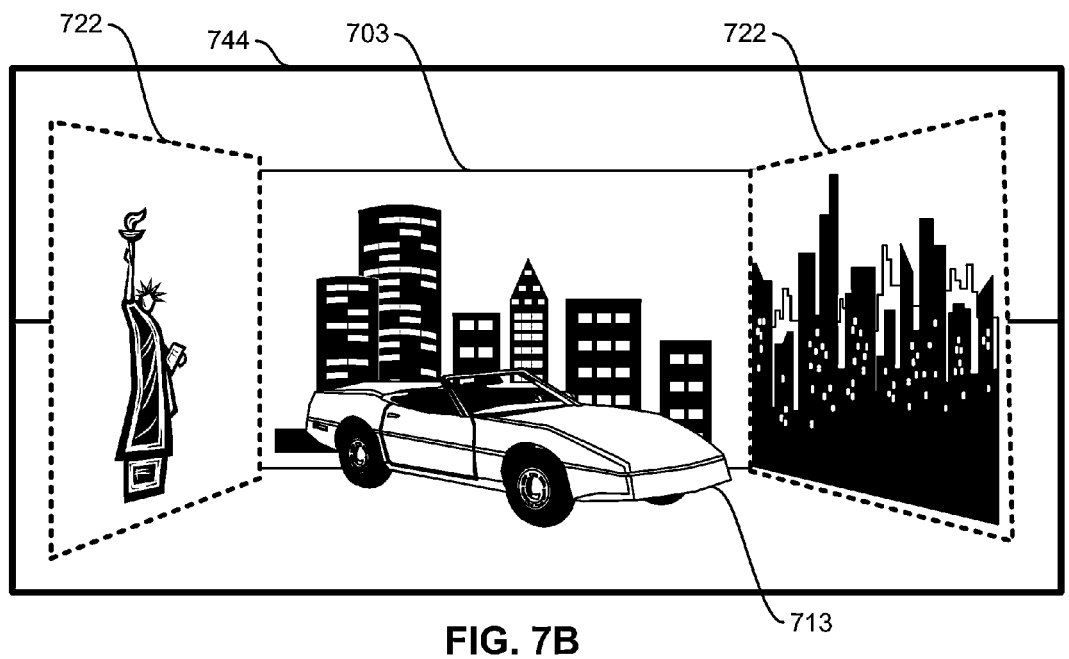
FIG. 7B illustrates an example embodiment of an image of an enhanced scene.

FIG. 7A illustrates an example embodiment of an image 742 of a physical scene. The image 742 includes a chroma-key screen 703, a foreground object 713, and three background objects 714. FIG. 7B illustrates an example embodiment of an image 744 of an enhanced scene of the image 742 of the physical scene that is illustrated in FIG. 7A. The image 744 of the enhanced scene adds virtual-scene images to the chroma-key screen 703. However, the foreground object 713 appears to be in front of the virtual-scene image on the chroma-key screen 703. Additionally, the image 744 includes two proxy models 722. The proxy models 722 also include virtual-scene images, and the proxy models 722 appear to obstruct the background objects 714.

Figure 8A:
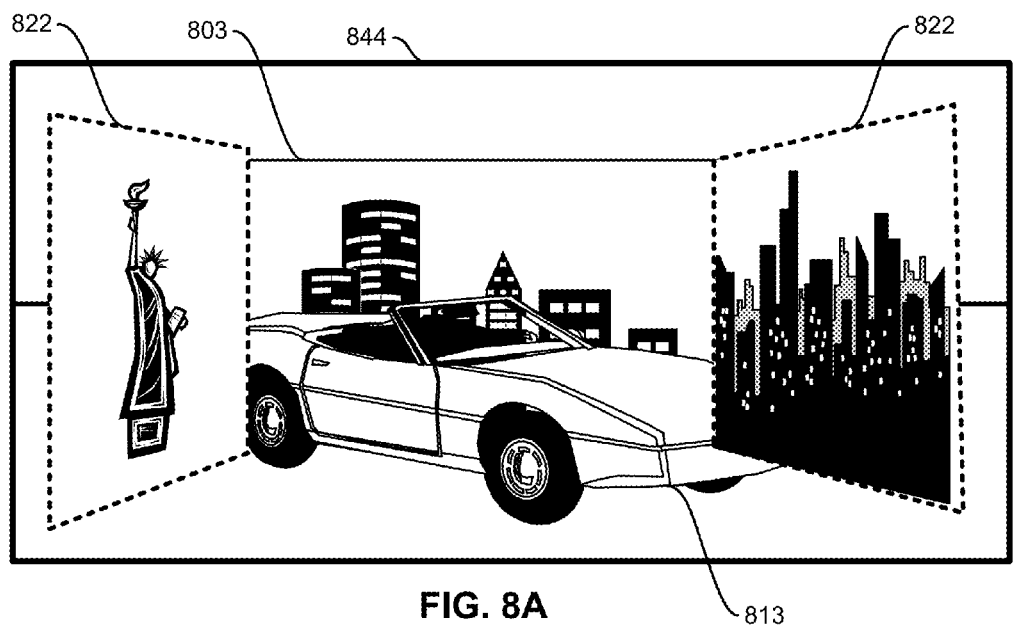
FIG. 8A illustrates an example embodiment of an image of an enhanced scene.

FIG. 8A illustrates an example embodiment of an image 844 of an enhanced scene. The image 844 includes a chroma-key screen 803, which has virtual-scene imagery added thereon, a foreground object 813, and two proxy models 822, which also include virtual-scene images. In this embodiment, the depth of the foreground object 813 from the camera is not taken into account when the proxy models 822 are added to the image 844. In FIG. 8A, when the proxy models 822 are moved to their respective positions, they appear to overlap the foreground object 813. For example, in some embodiments the pixels in the original image that correspond to the areas occupied by the proxy models 822 are simply replaced by the images of the proxy models 822. Thus, the pixels of a foreground object 813 could be replaced by the image of a proxy model 822.

Figure 8B:
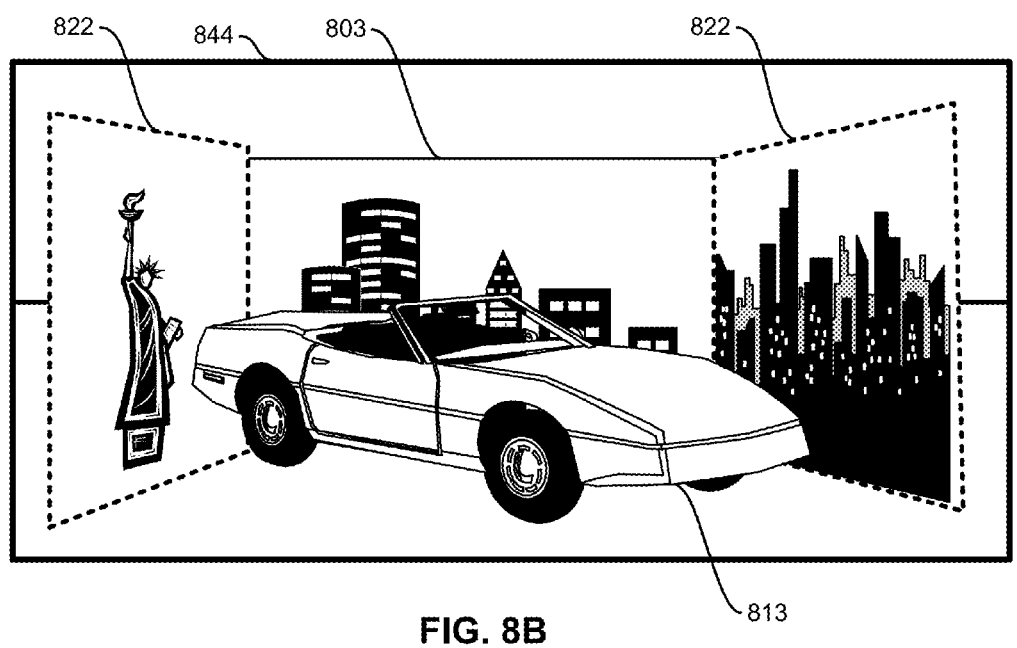
FIG. 8B illustrates an example embodiment of an image of an enhanced scene.

FIG. 8B illustrates an example embodiment of an image 844 of an enhanced scene. The image 844 also includes a chroma-key screen 803, which has virtual-scene imagery added thereon, a foreground object 813, and two proxy models 822, which also include virtual-scene imagery. However, in this embodiment, the depth from the camera of the foreground object 813 is taken into account when the proxy models 822 are added to the image 844. Thus, the foreground object 813 appears to obstruct the view of the proxy models 822 in the image 844. For example, some embodiments use depth information (acquired, for example, by a stereoscopic camera, a time-of-flight camera, etc.) to calculate the distance of foreground objects 813 from the camera and avoid replacing pixels of a foreground object 813 with pixels of a proxy model 822 that is positioned behind the foreground object 813, relative to the viewpoint.

Figure 9A:
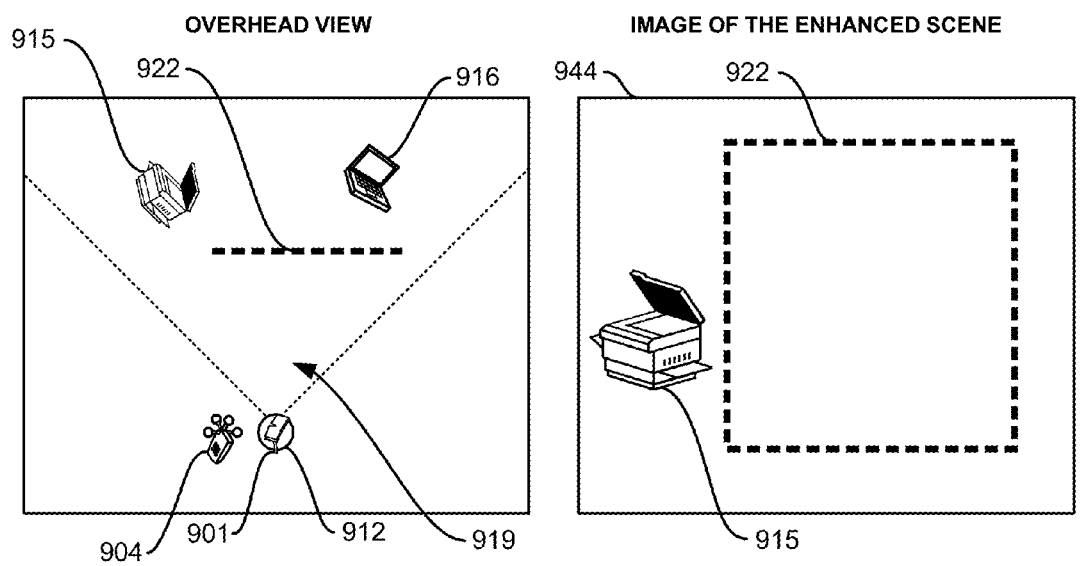
FIG. 9A illustrates an example embodiment of an overhead view of a physical space that is associated with a world-coordinate system and an example embodiment of an image of an enhanced scene.

FIG. 9A illustrates an example embodiment of an overhead view of a physical space that is associated with a world-coordinate system and an example embodiment of an image of an enhanced scene. The overhead view illustrates the relative positions of a first object 915, a second object 916, and a proxy model 922 in the world-coordinate system, relative to an observer 912. In this embodiment, the camera that obtains the image of the physical scene directly detects depth, and the first object 915, the second object 916, and the proxy model 922 are assigned coordinates in the world-coordinate system based on the detected depth. The overhead view also illustrates the observer 912, who is wearing a model-interface device 901 and who is holding a controller 904. The overhead view additionally illustrates an overhead view of the observer's field of view 919.

The image of the enhanced scene 944 shows the view of the enhanced scene that the observer 912 sees in the model-interface device 901. The image 944 shows the first object 915 and the proxy model 922. However, because the proxy model 922 obstructs the second object 916 relative to the positions of the proxy model 922, the second object 916, and the observer 912, the image 944 does not show the second object 916. Instead, in the image 944 the proxy model 922 appears to obstruct the second object 922.

Figure 9B:
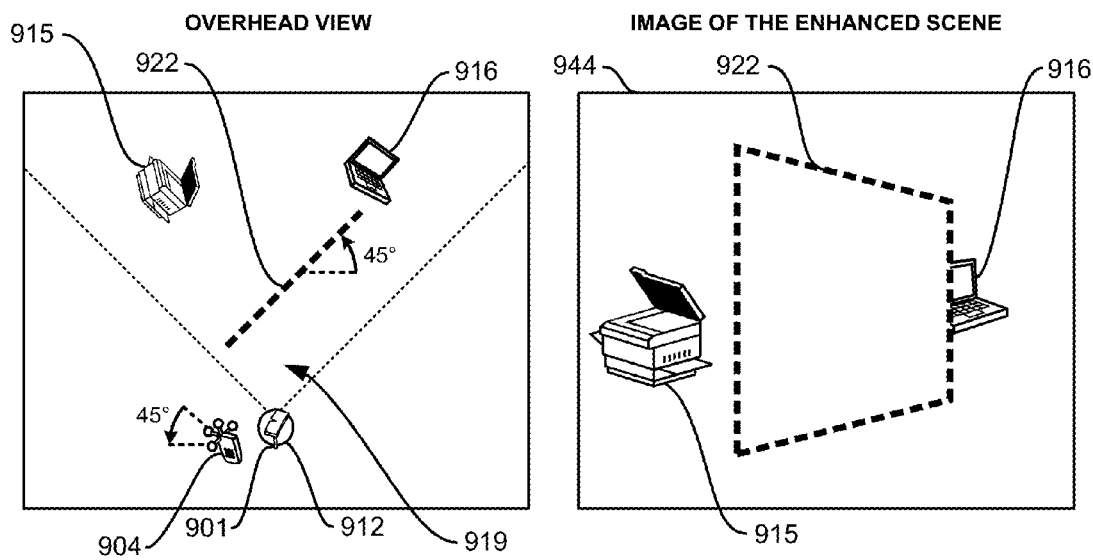
FIG. 9B illustrates an example embodiment of an overhead view of a physical space that is associated with a world-coordinate system and an example embodiment of an image of an enhanced scene.

FIG. 9B also illustrates an example embodiment of an overhead view of a physical space that is associated with a world-coordinate system and an example embodiment of an image of an enhanced scene. The overhead view illustrates the relative positions of a first object 915, a second object 916, and a proxy model 922, relative to an observer 912. In this embodiment, the camera that obtains the image of the physical scene directly detects depth, and the first object 915, the second object 916, and the proxy model 922 are assigned coordinates in the world-coordinate system based on the detected depth. Furthermore, the overhead view illustrates the observer 912, who is wearing a model-interface device 901 and who is holding a controller 904. The overhead view additionally illustrates an overhead view of the observer's field of view 919.

In this embodiment, the controller 904 has been rotated 45° relative to the controller 904 in FIG. 9A. Thus, the proxy model 922 in FIG. 9B has been rotated 45° relative to the proxy model 922 in FIG. 9A. After the rotation, the proxy model 922 no longer completely obstructs the second object 916 from the vantage point of the observer 912. Accordingly, in the image of the enhanced scene 944, the first object 915, the proxy model 922, and the second object 916 are all at least partially visible. Furthermore, the proxy model 922 appears to be rotated from the perspective that is shown in the image 944.

FIG. 10A illustrates example embodiments of an image of a physical scene, an overhead view of a physical space that is associated with a world-coordinate system, and an image of an enhanced scene. The image of the physical scene 1042 shows a first object 1015 and a second object 1016. The overhead view of the world-coordinate system show the relative positions of a proxy model 1022 and an observer 1012 in the world-coordinate system. The observer is assumed to be wearing the model-interface device 1001. In this embodiment, the first object 1015 and the second object 1016 are not assigned coordinates in the world-coordinate system. When generating the image of the enhanced scene 1044, the proxy model 1022 is overlaid on the image 1042 of the physical scene regardless of the depth of any object in the physical scene. Thus, the image 1044 of the enhanced scene includes the first object 1015 and the proxy model 1022. However, because the proxy model 1022 overlays the second object 1016, the second object 1016 is not shown in the image 1044 of the enhanced scene.

FIG. 10B also illustrates example embodiments of an image of a physical scene, an overhead view of a physical space that is associated with a world-coordinate system, and an image of an enhanced scene. The image of the physical scene 1042 shows a first object 1015 and a second object 1016. The overhead view of the world-coordinate system show the relative positions of a proxy model 1022 and an observer 1012 in the world-coordinate system. The observer is assumed to be wearing the model-interface device 1001. In FIG. 10B, the controller 1004 has been moved 6 inches to the left, relative to the controller 1004 in the overhead view in FIG. 10A. The system scales the movement of the controller 1004 by a factor of 6, and thus the proxy model 1022 in FIG. 10B is moved 3 feet to the left relative to the proxy model 1022 in FIG. 10A.

Also in this embodiment, when generating the image 1044 of the enhanced scene, the proxy model 1022 is overlaid on the image 1042 of the physical scene regardless of the depth of any object in the physical scene. However, because the proxy model 1022 has been moved to the left, the image 1044 of the enhanced scene also shows the partially obstructed first object 1015 and the partially obstructed second object 1016.

Figure 11:
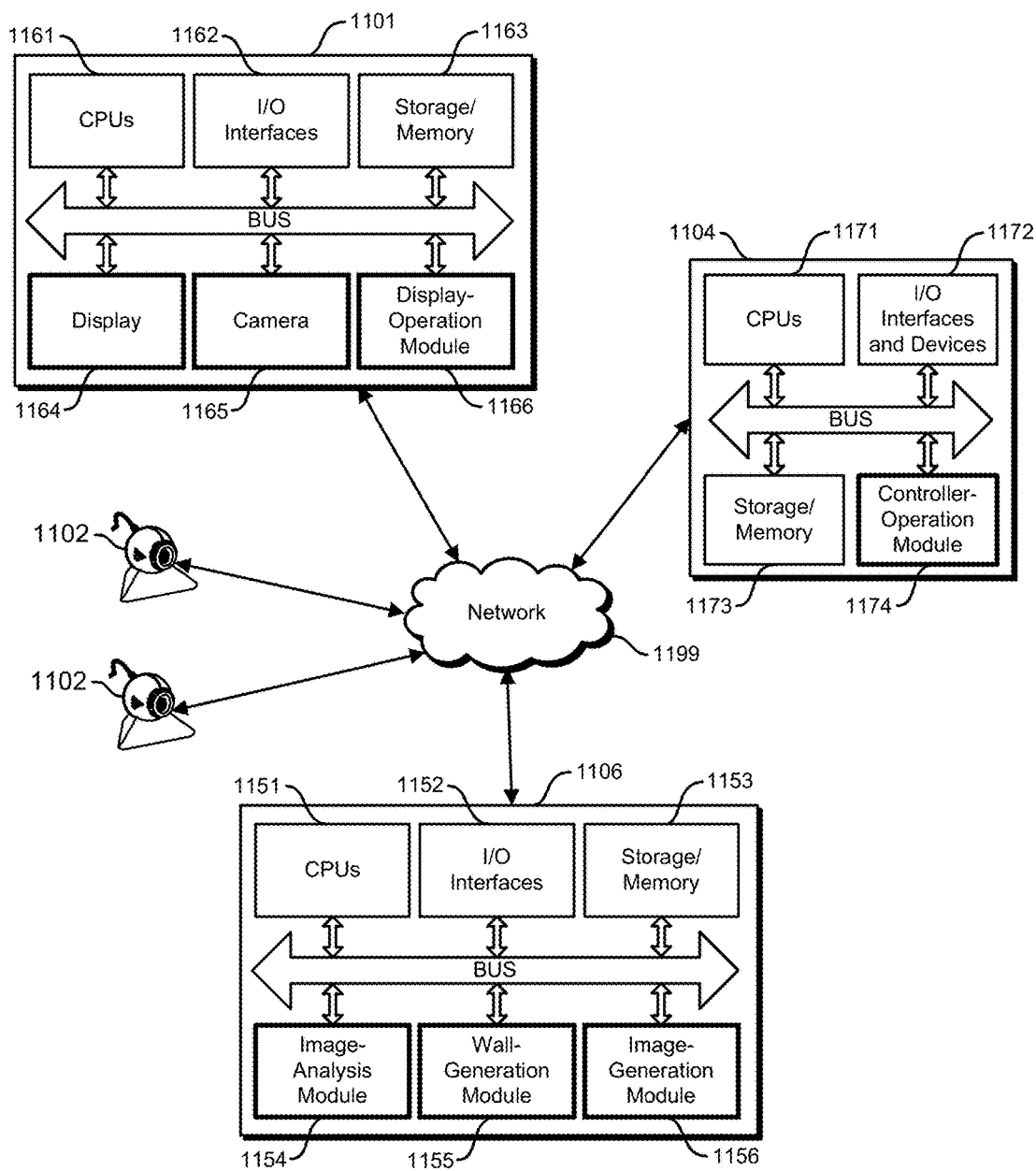
FIG. 11 illustrates an example embodiment of a system for generating an enhanced scene.

FIG. 11 illustrates an example embodiment of a system for generating proxy models. The system includes an image-enhancing device 1106, a controller 1104, a model-interface device 1101, and two cameras 1102 (some embodiments may include more or fewer cameras). In this embodiment, the devices communicate by means of one or more networks 1199, which may include a wired network, a wireless network, a LAN, a WAN, a MAN, and PAN, etc. In some embodiments, the devices communicate by means of other wired or wireless channels.

The image-enhancing device 1106 includes one or more processors (CPUs) 1151, one or more I/O interfaces 1152, and storage/memory 1153. The CPUs 1151 include one or more central processing units, which include microprocessors (e.g., a single core microprocessor, a multi-core microprocessor) or other circuits, and the CPUs 1151 are configured to read and perform computer-executable instructions, such as instructions in storage, in memory, or in a module. The I/O interfaces 1152 include communication interfaces to input and output devices, which may include a keyboard, a display, a mouse, a printing device, a touch screen, a light pen, an optical-storage device, a scanner, a microphone, a camera, a drive, a controller, and a network (either wired or wireless).

The storage/memory 1153 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 1153 can store computer-readable data or computer-executable instructions. The components of the image-enhancing device 1106 communicate via a bus.

The image-enhancing device 1106 also includes an image-analysis module 1154, a wall-generation module 1155, and an image-generation module 1156. A module includes logic, computer-readable data, or computer-executable instructions, and may be implemented in software (e.g., Assembly, C, C++, C#, Java, BASIC, Perl, Visual Basic), hardware (e.g., customized circuitry), or a combination of software and hardware. In some embodiments, the devices in the system include additional or fewer modules, the modules are combined into fewer modules, or the modules are divided into more modules.

The image-analysis module 1154 includes instructions that, when executed, or circuits that, when activated, cause the image-enhancing device 1106 to perform or more of the following: obtain images of a physical scene from the model-interface device 1101, identify chroma-key areas in the image of the physical scene, determine the respective depths of objects in the image of the physical scene, obtain images from the cameras 1102, determine a position of the model-interface device 1101 based on the images that are obtained from the cameras 1102, determine a position of the controller 1171 based on the images that are obtained from the cameras 1102, detect movements of the model-interface device 1101 based on the images that are obtained from the cameras 1102, detect movements from the controller 1171 based on the images that are obtained from the cameras 1102, detect a position of an observer based on the images that are obtained from the cameras 1102, and detect movement of an observer based on the images that are obtained from the cameras 1102.

The wall-generation module 1155 includes instructions that, when executed, or circuits that, when activated, cause the image-enhancing device 1106 to perform one or more of the following: define coordinates for a virtual space, generate a proxy model in the virtual space at defined coordinates, modify (e.g., move, rotate, reshape, recolor) the proxy model in the virtual space, and define virtual-space coordinates for objects that are in the physical scene.

The image-generation module 1156 includes instructions that, when executed, or circuits that, when activated, cause the image-enhancing device 1106 to generate images of an enhanced scene based on one or more of the following: the proxy models, the detected chroma-key areas, any objects and their coordinates in the virtual space, virtual-scene imagery for the chroma-key areas or the proxy models, and images of the physical scene.

The model-interface device 1101 includes one or more processors (CPUs) 1161, one or more I/O interfaces 1162, storage/memory 1163, one or more display 1164, a camera 1165, and a display-operation module 1166. The display-operation module 1166 includes instructions that, when executed, or circuits that, when activated, cause the model-interface device 1101 to perform one or more of the following: obtain images of a physical scene by means of the camera 1165, receive images of an enhanced scene from the image-enhancing device 1106, and display images of the enhanced scene on the display 1164.

The controller 1104 includes one or more processors (CPUs) 1171, one or more I/O interfaces and devices 1172 (e.g., buttons, wheels, control pads, joysticks, touch screens), storage/memory 1173, and a controller-operation module 1174. The controller-operation module 1174 includes instructions that, when executed, or circuits that, when activated, cause the controller 1104 to receive commands from the one or more I/O interfaces and devices 1172 and send the commands to the image-enhancing device 1106.

Figure 12:
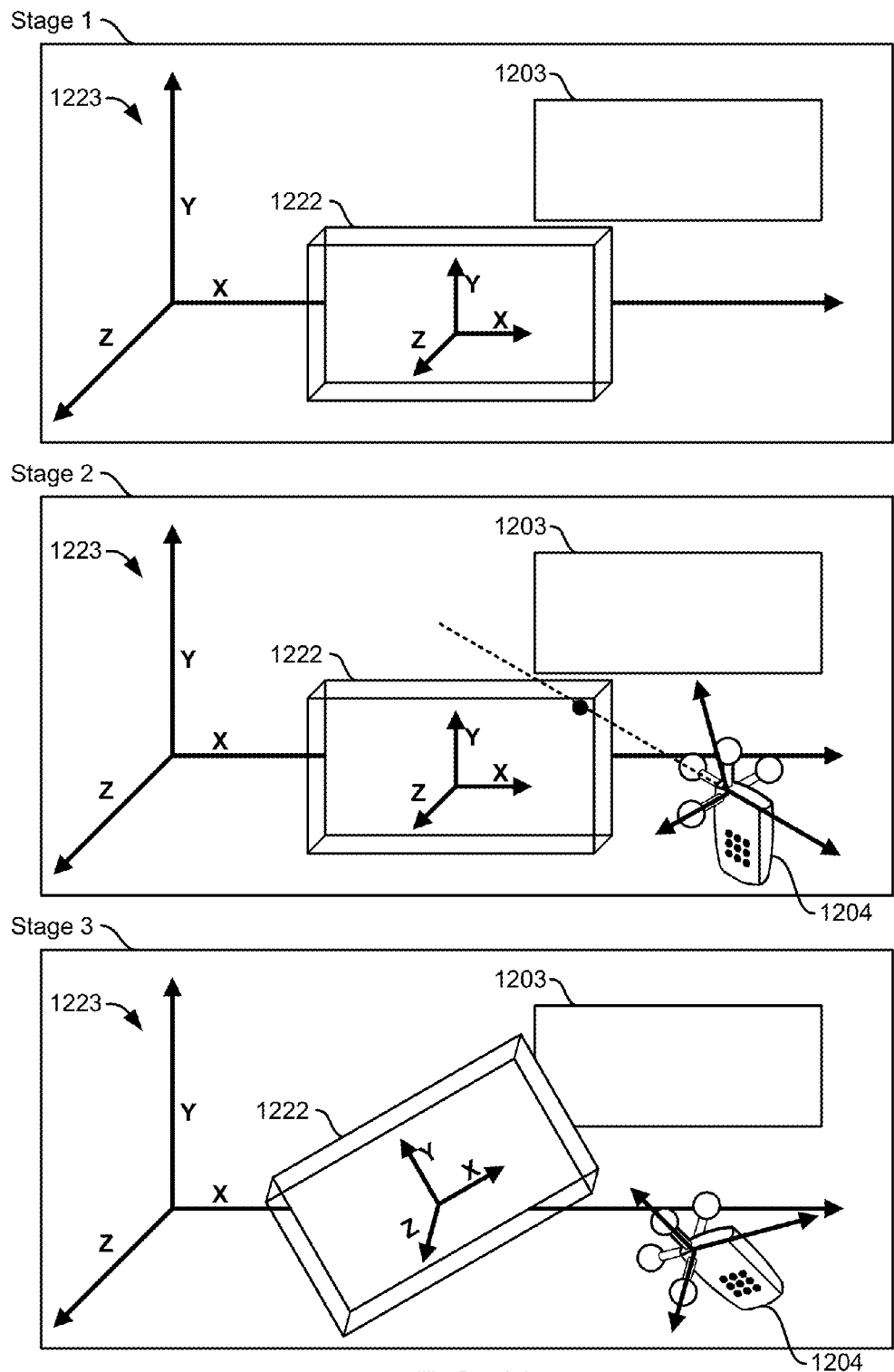
FIG. 12 illustrates an example embodiment of the creation, selection, and movement of a proxy model.

FIG. 12 illustrates an example embodiment of the creation, selection, and movement of a proxy model. In stage 1, a proxy model 1222 is created at an arbitrary location, as defined by world coordinates 1223, relative to a chroma-key screen 1203. Then in stage 2, the proxy model 1222 is selected by means of a command from the controller 1204. For example, the controller 1204 may include a virtual "laser pointer", which a user may use to select the proxy model by direction the virtual laser pointer at the proxy model and activating the virtual laser pointer.

Following, in stage 3, the proxy model 1222 is moved according to commands that are indicated by the controller 1204. In some embodiments, the controller 1204 sends an electrical signal to indicate the command, and in some embodiments the controller 1204 indicates commands through movements of the controller 1204 (movements which are detected by one or more cameras that track the movements of the controller 1204 (e.g., a six-degree-of-freedom controller)).

For example, while moving the proxy model 1222, some embodiments compute the coordinates of the proxy model 1222 according to the following:

$$T\{WC \rightarrow VWC\} = (T\{WC \rightarrow VWC0\} * T\{LC0 \rightarrow WC\}) * T\{WC \rightarrow LC\},$$

where WC denotes the world coordinates, where VWC denotes the world coordinates of the proxy model 1222, where LC denotes the world coordinates (which are input data) of the controller 1204, where $T\{WC \rightarrow LC\}$ is the current transformation from world coordinates (WC) to controller coordinates LC, where $T\{WC \rightarrow VWC\}$ is the current transformation from world coordinates (WC) to proxy-model coordinates (VWC), where $T\{LC0 \rightarrow WC\}$ is the transformation from controller coordinates (LC) to world coordinates (WC) at the time the proxy model 1222 is selected (LC0 may be constant throughout the movement of the proxy model 1222), and where T{WC→VWC0} is the transformation from world coordinates (WC) to proxy-model coordinates (VWC) at the time when the proxy model is initially selected (VWC0 may be constant throughout the movement).

Figure 13:
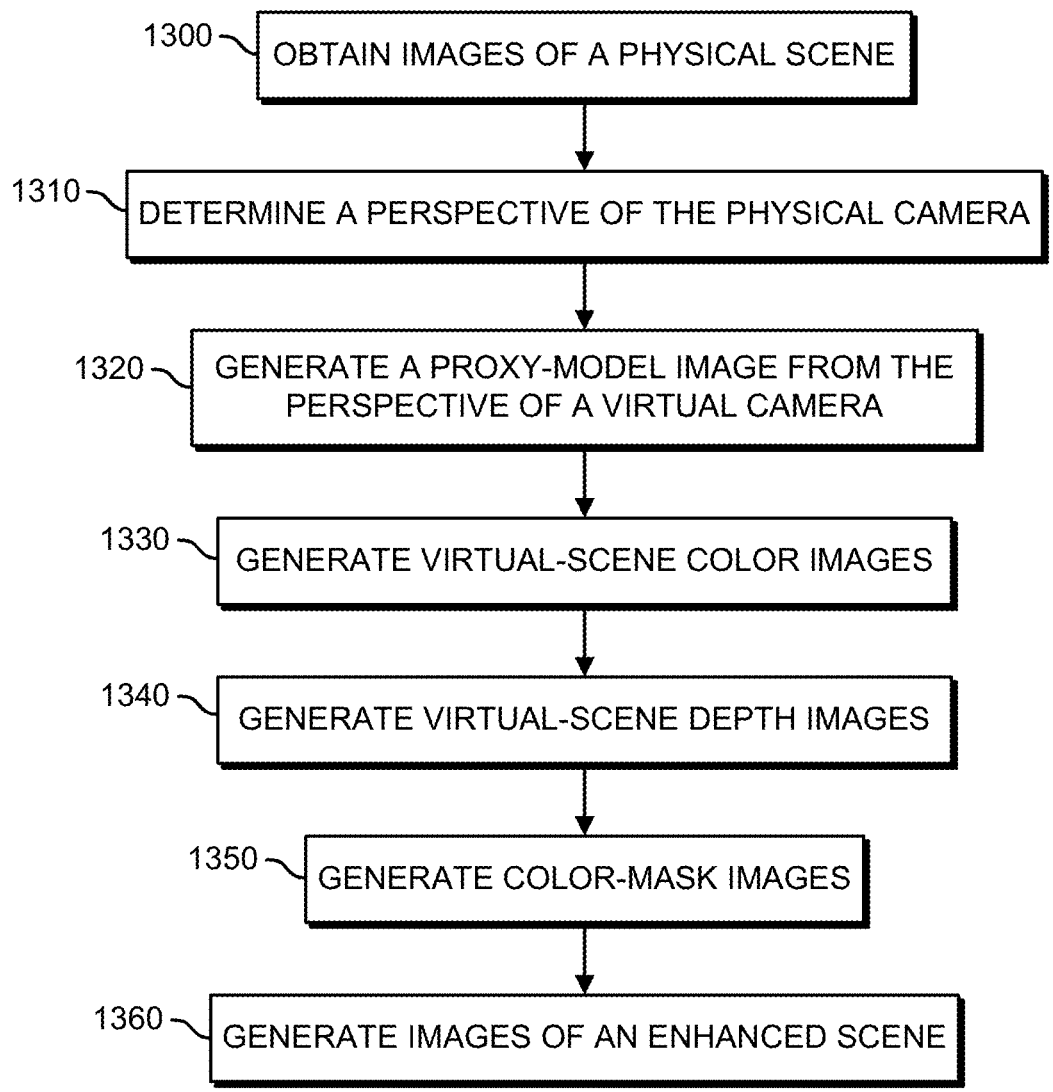
FIG. 13 illustrates an example embodiment of an operational flow for generating images of an enhanced scene.

FIG. 13 illustrates an example embodiment of an operational flow for generating images of an enhanced scene. Some embodiments of this operational flow do not include one or more of blocks 1320-1350. The flow starts in block 1300, where one or more images (e.g., visible-light images, depth images) of a physical scene are obtained (e.g., by an image-enhancing device). Next, in block 1310, a perspective of the physical camera that captured the obtained one or more images is determined.

The flow then proceeds to block 1320, where one or more proxy-model images are generated, for example from the perspective of a virtual camera that has the same perspective in a world-coordinate system as the physical camera. The proxy-model images may include proxy-model category images and proxy-model depth images.

In a proxy-model category image, each pixel indicates one of the following: (1) the category of the nearest proxy model that has a point that, from the perspective of the camera, projects to a point within the area of the pixel, or (2) a specified value (e.g., a default value) that indicates that no proxy model has a point that, from the perspective of the camera, projects to the area of the pixel.

In a proxy-model depth image, each pixel indicates one of the following: (1) the distance from the camera to the nearest proxy model that has a point that, from the perspective of the camera, projects to a point within the area of the pixel, or (2) a specified value (e.g., a default value) that indicates that no proxy model has a point that, from the perspective of the camera, projects to the area of the pixel.

The flow then moves to block 1330, where one or more virtual-scene color images are generated. A virtual-scene color image is a color image (as opposed to a depth image) of the virtual scene, and the virtual-scene color image may be generated from the perspective of a virtual camera that has the same position and orientation as the physical camera in the world-coordinate system. In the virtual-scene color image, the virtual scene is drawn unconditionally, and thus no rules are applied (e.g., chroma-key rules) that affect the visibility of the content of the virtual scene. Also, the virtual scene is not mixed with other image sources in the virtual-scene color image.

The flow then proceeds to block 1340, where one or more virtual-scene depth images are generated. A virtual-scene depth image may be generated from the perspective of a virtual camera that has the same position and orientation as the physical camera in the world-coordinate system. For example, some embodiments generate a virtual-scene depth image from the perspective of the virtual camera in which each pixel of the virtual-scene depth image indicates one of the following: (1) the distance from the camera to the nearest surface in the virtual scene that has a point that, from the perspective of the camera, projects to a point within the area of the pixel, or (2) a specified value (e.g., a default value) that indicates that no surface has a point that, from the perspective of the camera, projects to the area of the pixel.

Next, in block 1350, one or more color-mask images are generated. A color-mask image may be generated from the perspective of the virtual camera. In a color-mask image, the value of each pixel indicates one of the following: (1) the color of a corresponding pixel of the visible-light image is included in the specified set of colors that indicate a specific category (e.g., "background", "foreground", or "virtual", etc.), for example a chroma-key color that indicates a background, or (2) a default value that indicates that the color of a corresponding pixel of the visible-light image is not included in the specified set of colors that indicate a specific category.

Finally, in block 1360, output images of an enhanced scene are generated based on the one or more images of a physical scene, the one or more proxy-model images, the one or more virtual-scene color images, the one or more virtual-scene depth images, or the one or more color-mask images.

For example, when generating an image of the enhanced scene, some embodiments start with a default virtual-scene image, and add "windows" to the image of the physical scene. The embodiments generate an image of an enhanced scene by doing the following operations for each pixel ("output pixel"): set the color of the output pixel to the color of the corresponding pixel of the virtual-scene color image; and if the value of the corresponding pixel of the proxy-model category image implicitly or explicitly corresponds to the category "real", then set the color of the output pixel to the color of the corresponding pixel of the visible-light image of the physical scene. Accordingly, in these images of the enhanced scene, the virtual scene appears everywhere except where proxy models of the category "real" are "visible", where, instead, the physical scene is visible. Thus, the image of the enhanced scene conceptually shows a virtual scene that has windows or portals through which the physical scene can be seen.

Also, when generating an image of the enhanced scene, some embodiments do the following operations for each pixel ("output pixel"): set the color of the output pixel to the color of the corresponding pixel of the visible-light image; and if the value of the corresponding pixel of the proxy-model category image implicitly or explicitly corresponds to the category "virtual", then set the color of the output pixel to the color of the corresponding pixel of the virtual-scene color image. Thus, in these embodiments, the physical scene appears everywhere except where proxy-models of the category "virtual" are "visible", where the virtual scene is visible instead. Thus, the image of the enhanced scene conceptually shows a physical scene that has windows or portals through which the virtual scene can be seen.

Furthermore, when generating an image of the enhanced scene, some embodiments do the following operations for each pixel ("output pixel"): set the color of the output pixel to a default color (e.g., black); if the value of the corresponding pixel of the proxy-model category image implicitly or explicitly corresponds to the category "real", then set the color of the output pixel to the color of the corresponding pixel of the visible-light image; and if the value of the corresponding pixel of the proxy-model category image implicitly or explicitly corresponds to the category "virtual", then set the color of the output pixel to the color of the corresponding pixel of the virtual-scene color image. Thus, in these embodiments, emptiness (e.g., a specified default color, such as black) appears everywhere except where proxy-models of the category "real" are "visible" (where the physical scene is visible instead), and except where proxy-models of the category "virtual" are "visible" (where the virtual scene is visible instead). Accordingly, the image of the enhanced scene conceptually shows emptiness that has windows or portals through which the physical world can be seen and that has windows or portals through which a virtual scene can be seen.

Moreover, when generating an image of the enhanced scene, some embodiments do the following operations for each pixel ("output pixel"): set the color of the output pixel to the color of the corresponding pixel of the visible-light image; if the value of the corresponding pixel of the color-mask image is not the default value (in this embodiment, the default value indicates "no chroma-key screen"), then set the color of the output pixel to the color of the corresponding pixel of the virtual-scene color image; and if the value of the corresponding pixel of the proxy-model category image is not the default value, then set the color of the output pixel to the color of the corresponding pixel of the virtual-scene color image. Thus, the image of the enhanced scene conceptually shows the physical scene everywhere except for where a distinctive color (e.g., chroma-key color) is visible (where the virtual scene is visible instead) and except for where a proxy model is "visible" (where the virtual scene is visible instead). Therefore, this extends the visibility of the virtual scene to regions that are designated by the proxy models. In this embodiment, the proxy models are used to extend the visibility of the virtual scene beyond the area covered by the chroma-key screen.

Additionally, when generating an image of the enhanced scene, some embodiments do the following operations for each pixel ("output pixel"): set the color of the output pixel to the color of the corresponding pixel of the virtual-scene color image; and if the value of the corresponding pixel of the proxy-model category image implicitly or explicitly corresponds to the category "chroma-key proxy", and if the corresponding pixel of the color-mask image has a value that indicates "foreground" (or some other non-default value), then set the color of the output pixel to the color of the corresponding pixel of the visible-light image.

Accordingly, in the image of the enhanced scene, the virtual scene appears everywhere, except in places where a physical object obstructs the chroma-key-colored surface of a physical screen that has a corresponding proxy-model that identifies the region of the image as "chroma-key screen", where the physical object is visible instead. This embodiment may be convenient when the goal is to see a virtual scene everywhere except for where physical objects obstruct physical chroma-key screens, in which case the physical object will be visible instead of the virtual scene.

Also, when generating an image of the enhanced scene, some embodiments use available depth-image data to distinguish between foreground and background objects in a physical scene based on their respective distances from the physical camera. Some embodiments generate an image of an enhanced scene by doing the following operations for each pixel ("output pixel"): set the color of the output pixel to the color of the corresponding pixel of the virtual-scene color image; and if the value of the corresponding pixel of the physical-scene depth image has a value that is less than a specified depth value, then set the color of the output pixel to the color of the corresponding pixel of the visible-light image.

Thus, in the image of the enhanced scene, the virtual scene appears everywhere, except in places where a physical object is closer to the physical camera than a specified depth value, where, instead, the physical object is visible. These embodiments may be convenient when the goal is to see a virtual scene everywhere except where physical objects (e.g., foreground objects) are relatively close to the physical camera, in which case the physical object will be visible instead of the virtual scene.

Finally, when generating an image of the enhanced scene, some embodiments do the following operations for each pixel ("output pixel"): set the color of the output pixel to the color of the corresponding pixel of the virtual-scene color image; and if the value of the corresponding pixel of the physical-scene depth image has a value less than a specified depth value, then set the color of the output pixel to the color of the corresponding pixel of the visible-light image.

Furthermore, in some embodiments, if the value of the corresponding pixel of the proxy-model category image has a value of "real", and the proxy-model depth image has a depth that is less than the corresponding pixel of the physical-scene depth image, then the color of the output pixel is set to the color of the corresponding pixel of the visible-light image. And, in some embodiments, if the value of the corresponding pixel of the proxy-model category image has a value of "virtual", and the proxy-model depth image has a depth that is less than the corresponding pixel of the physical-scene depth image, then the color of the output pixel is set to the color of the corresponding pixel of the virtual-scene color image.

Thus, some of these embodiments, if there is a proxy-model in the category "real" that is closer to the camera than part of the physical scene, then show the image of the physical scene in that part of the output image, or, if there is a proxy-model in the category "virtual" that is closer than part of the physical scene, then show the virtual-scene imagery in that part of the image of the enhanced scene.

These embodiments enable physical objects that are resting upon a physical floor to appear on top of a virtual floor in a virtual scene. For example, a proxy model can be used to specify a slab of the physical floor and specify that virtual-scene imagery should be displayed there. Physical objects that are resting on the physical floor will be closer to the camera than the floor-slab proxy model, and so the physical objects will appear in place of (and hence appear on top of) the floor.

Figure 14:
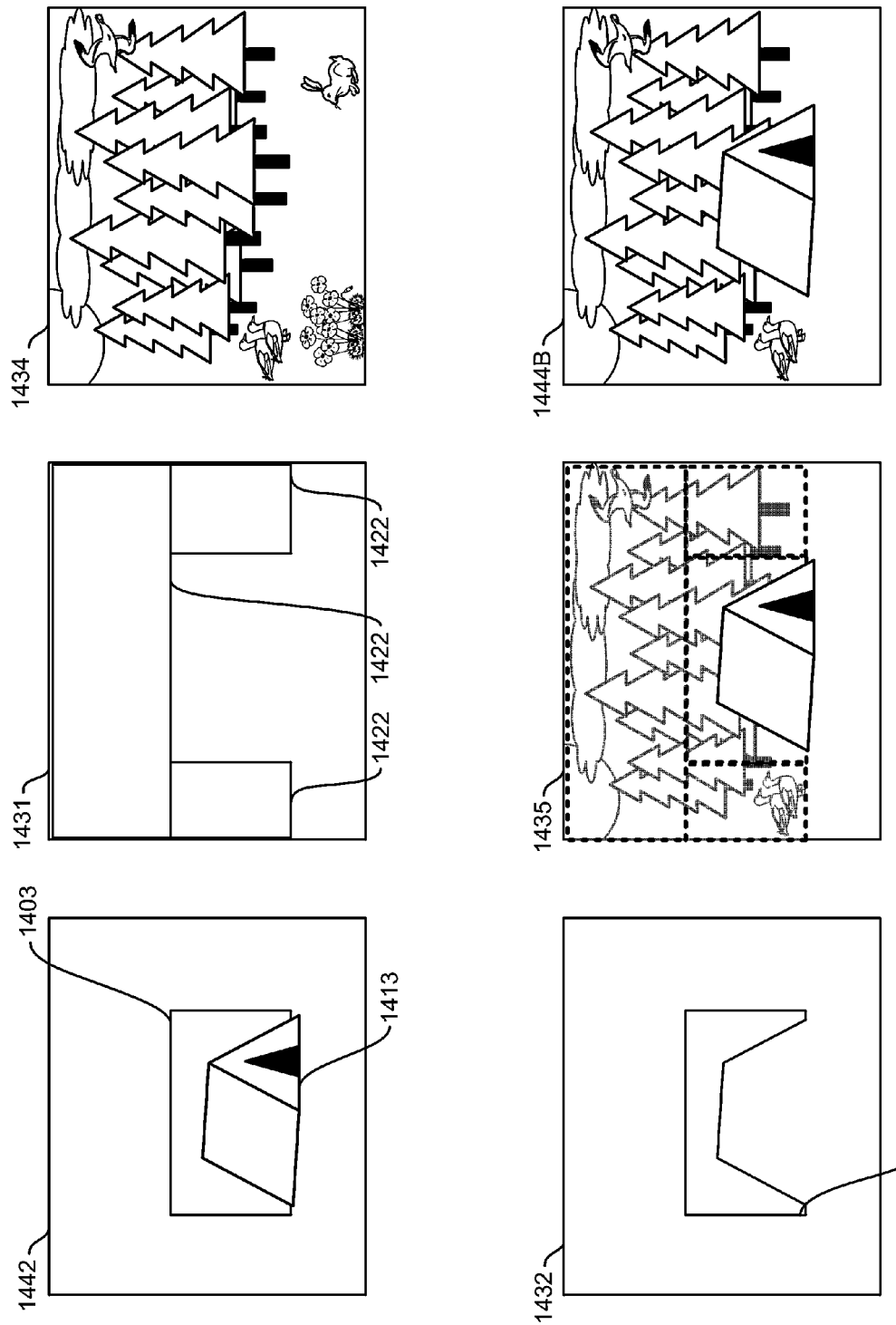
FIG. 14 illustrates example embodiments of an image of a physical scene, a proxy-model image, an image of a virtual scene, a color-mask image, an overlay image, and an image of an enhanced scene.

FIG. 14 illustrates example embodiments of an image of a physical scene 1442, a proxy-model image 1431, an image of a virtual scene 1434, a color-mask image 1432, an overlay image 1435, and an image of an enhanced scene 1444. The image of the physical scene 1442 shows a foreground object 1413 and a chroma-key screen 1403. The proxy-model image 1431 shows three proxy models 1422. The image of the virtual scene 1434 is a virtual-scene color image. The color-mask image 1432 is generated from the image of the physical scene 1442 and includes a mask 1433. The mask 1433 shows the areas of the image of the physical scene 1442 that include a color (e.g., green) that belongs to the set of colors that are used to indicate a part of the image that is to be enhanced. The overlay image 1435 shows the outline of the mask 1433, the outlines of the proxy models 1422, and the areas of the virtual-scene color image that have been added to the mask 1433 and the proxy models 1422. Finally, the image of the enhanced scene 1444 shows the foreground object 1413 and the areas of the image of the virtual scene 1434 that were added to the mask 1433 and the proxy models 1422.

The above-described devices and systems can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
   obtaining, at one or more computing devices, an image of a physical scene from a first camera;
   generating, at the one or more computing devices, a virtual wall at an initial position in a world-coordinate system and an initial orientation in the world-coordinate system;
   receiving, at the one or more computing devices, a controller command that was issued by a controller, wherein the controller command is a command to change the position or the orientation of the virtual wall;
   changing, at the one or more computing devices, the position of the virtual wall to a second position or the orientation of the virtual wall to a second orientation in the world-coordinate system according to the controller command received from the controller; and
   generating an image of an enhanced scene based on the image of the physical scene, wherein the enhanced scene shows a part of the image of the physical scene and shows computer-generated imagery,
   wherein the image of the enhanced scene has a field of view,
   wherein, as defined by the position of the virtual wall in the world-coordinate system, a part of the field of view includes at least some of the virtual wall, and
   wherein the image of the enhanced scene includes a computer-generated image in the part of the field of view that includes the virtual wall.

2. The method of claim 1, wherein the controller is an input device that can be physically manipulated by a user to send one or more commands to the one or more computing devices.

3. The method of claim 2, wherein the controller issues respective commands when the controller is translated along one or more of three axes and when the controller is rotated about one or more of the three axes.

4. The method of claim 1, further comprising:
   replacing the computer-generated image in the image of the enhanced scene with a transparent polygon or with a semi-transparent image of the computer-generated image for a predetermined period of time after receiving a controller command.

5. The method of claim 1, wherein a model-coordinate system, which includes three orthogonal axes and an origin, is fixed in relation to the position and the orientation of the virtual wall, and wherein the method further comprises orienting the virtual wall such that an axis of the model-coordinate system is aligned with an axis of the world-coordinate system or is aligned with a nearest angle of a set of discrete angles of the world-coordinate system.

6. The method of claim 3, wherein receiving the controller command that was issued by the controller includes
   receiving images of the controller from a second camera that captures images of the controller, and
   identifying a movement of the controller, wherein the movement is a translation of the controller along at least one of the three axes of the controller or a rotation of the controller about at least one of the three axes of the controller, based on the images of the controller,
   wherein the controller command is a command to move the virtual wall relative to at least one of three axes of the virtual wall in a movement that is proportional to the movement of the controller relative to the at least one of the three axes of the controller.

7. The method of claim 1, wherein the virtual wall defines a size of an area, a shape of the area, a position of the area in the world-coordinate system, and an orientation of the area in the world-coordinate system.

8. A system for generating an enhanced image, the system comprising:
   one or more computer-readable media; and
   one or more processors that are coupled to the one or more computer-readable media and that are configured to cause the system to
   obtain an image of a physical scene from a first camera,
   calculate a position and an orientation of the first camera in a world-coordinate system,
   generate a virtual wall at an initial position and an initial orientation in the world-coordinate system,
   generate an enhanced image of the physical scene from the perspective of a virtual camera at the position and the orientation of the first camera, wherein the enhanced scene shows a part of the image of the physical scene and shows computer-generated imagery, wherein the enhanced image includes a computer-generated image in an area defined by the virtual wall,
   receive images of a controller in the physical scene from a second camera,
   identify a movement of the controller in the images of the controller, and
   reposition the virtual wall to a second position or a second orientation in the world-coordinate system according to the movement of the controller.

9. The system of claim 8, wherein, to generate the enhanced image of the physical scene, the one or more processors are configured to cause the system to
   for each pixel in the area defined by the virtual wall in the enhanced image of the physical scene, set a color of the pixel in the enhanced image to a color of a corresponding pixel of the computer-generated image; and
   for each pixel in the enhanced image of the physical scene that is not in the area defined by the virtual wall, set a color of the pixel in the enhanced image to a color of a corresponding pixel in the image of the physical scene.

10. The system of claim 8, wherein the one or more processors are further configured to cause the system to
   generate a physical-scene depth image from the position and the orientation of the first camera, wherein each pixel of the physical-scene depth image indicates a depth from the first camera to a respective object depicted by the pixel, and generate the enhanced image of the physical scene further based on the physical-scene depth image.

11. The system of claim 8, wherein the controller is an input device that can be physically manipulated by a user to issue one or more command signals.

12. The system of claim 8, wherein the movement of the controller is a rotation about an axis of the controller, and
wherein, to reposition the virtual wall to the second position or the second orientation in the world-coordinate system according to the movement of the controller, the one or more processors are configured to cause the system to rotate the virtual wall about a corresponding axis of the virtual wall.

13. The system of claim 8, wherein the movement of the controller is a translation on an axis, and
wherein, to reposition the virtual wall to the second position or the second orientation in the world-coordinate system according to the movement of the controller, the one or more processors are configured to cause the system to translate the virtual wall on a corresponding axis of the virtual wall.

14. One or more computer-readable storage media storing instructions that, when executed by one or more computing devices, cause the one or more computing devices to perform operations comprising:
obtaining an image of a physical scene from a first camera;
calculating a position and an orientation of the first camera in a world-coordinate system;
generating a virtual wall at an initial position and an initial orientation in the world-coordinate system;
receiving a command that was issued by a controller, wherein the command indicates a new position of the virtual wall;
changing the position of the virtual wall to the new position indicated by the command;
generating an enhanced image of the physical scene from the perspective of a virtual camera at the position and the orientation of the first camera, wherein the enhanced image shows a part of the image of the physical scene and shows computer-generated imagery, wherein a part of a field of view of the enhanced image includes the virtual wall, and wherein the enhanced image includes the computer-generated imagery in the part of the field of view that includes the virtual wall.

15. The one or more computer-readable storage media of claim 14, wherein the physical scene includes a green screen, and
wherein the operations further comprise:
generating a color-mask image, wherein each pixel of the color-mask image indicates whether a color of a corresponding pixel in the image of the physical scene is a default value or is a part of the green screen,
wherein generating the enhanced image includes changing a respective value of each pixel in the image of the physical scene that is part of the green screen to a respective different value.

16. The one or more computer-readable storage media of claim 14, wherein the operations further comprise
receiving a selection command from the controller, wherein the selection command identifies a selected virtual wall.

17. The one or more computer-readable storage media of claim 16, wherein the operations further comprise
receiving a second command that was issued by the controller; and
repositioning the selected virtual wall in the world-coordinate system according to the second command.

18. The one or more computer-readable storage media of claim 16, wherein the operations further comprise
highlighting the selected virtual wall in the enhanced image of the physical scene.

19. The one or more computer-readable storage media of claim 14, wherein the command is a command to rotate the virtual wall about a first axis, and
wherein the operations further comprise
determining that an edge of an area defined by the virtual wall is oriented within a specified angle of a second axis, and
orienting the virtual wall to align the edge of the area defined by the virtual wall with the second axis.

20. The one or more computer-readable storage media of claim 14, wherein the virtual wall defines a size of an area, a shape of the area, a position of the area in the world-coordinate system, and an orientation of the area in the world-coordinate system.

* * * * *